United States Patent
Zou et al.

(10) Patent No.: US 11,640,324 B2
(45) Date of Patent: May 2, 2023

(54) INTELLIGENT CLOUD MANAGEMENT BASED ON PROFILE

(71) Applicant: Microsoft Technology Licensing, LLC, Redmond, WA (US)

(72) Inventors: Miao Zou, Redmond, WA (US); Tianjing Xu, Redmond, WA (US); Shanshan Liu, Redmond, WA (US); Hao Liu, Redmond, WA (US); Jian Zhou, Redmond, WA (US); Yucao Wang, Redmond, WA (US); Lei Zhang, Bellevue, WA (US); Ao Guo, Redmond, WA (US); David Liu, Redmond, WA (US); Danmeng Liu, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/827,026

(22) Filed: May 27, 2022

(65) Prior Publication Data

US 2022/0291969 A1     Sep. 15, 2022

Related U.S. Application Data

(63) Continuation of application No. 16/605,419, filed as application No. PCT/US2018/028732 on Apr. 21, 2018, now Pat. No. 11,354,166.

(30) Foreign Application Priority Data

May 12, 2017    (CN) .......................... 201710335366.8

(51) Int. Cl.
*G06F 9/44*     (2018.01)
*G06F 9/50*     (2006.01)
(Continued)

(52) U.S. Cl.
CPC ........ *G06F 9/5072* (2013.01); *G06F 11/3006* (2013.01); *G06F 11/3051* (2013.01); *G06F 11/3409* (2013.01); *G06F 11/3438* (2013.01)

(58) Field of Classification Search
CPC ...................................................... G06F 9/5072
(Continued)

(56) References Cited

U.S. PATENT DOCUMENTS 9,300,548  B2 *   3/2016  Asthana .............. H04L 41/5025
2011/0295999  A1  12/2011  Ferris et al.
(Continued)

FOREIGN PATENT DOCUMENTS

CN       103875210 A     6/2014

OTHER PUBLICATIONS

"Office Action Issued in Chinese Patent Application No. 201710335366. 8", (w/ English Translation), dated Jul. 5, 2022, 9 Pages.
(Continued)

*Primary Examiner* — Timothy A Mudrick
(74) *Attorney, Agent, or Firm* — Schwegman Lundberg & Woessner, P.A.

(57) ABSTRACT

The present disclosure provides technical solutions related to intelligent cloud management based on profile. Artificial intelligent is applied to cloud management and cloud management suggestion may be proposed intelligently. In daily work, behaviors in using cloud resources may show characteristics of cloud users or cloud tenants themselves. The technical solution of intelligent cloud management of the present disclosure generates profile identifying cloud using characteristics by extracting behavior data in using cloud and intelligently proposes cloud management suggestions based on the profile.

20 Claims, 14 Drawing Sheets

(51) Int. Cl.
*G06F 11/30* (2006.01)
*G06F 11/34* (2006.01)

(58) Field of Classification Search
USPC .......................................................... 709/223
See application file for complete search history.

(56) References Cited

U.S. PATENT DOCUMENTS

| | | | |
|---|---|---|---|
| 2013/0097304 A1 | 4/2013 | Asthana et al. | |
| 2013/0198050 A1 | 8/2013 | Shroff et al. | |
| 2015/0106512 A1 | 4/2015 | Cama et al. | |
| 2016/0180222 A1* | 6/2016 | Sierhuis | G16H 50/50 706/47 |
| 2018/0131579 A1* | 5/2018 | Jacobs | H04L 41/022 |

OTHER PUBLICATIONS

U.S. Appl. No. 16/605,419 U.S. Pat. No. 11,354,166, Oct. 15, 2019, Intelligent Assistant for Cloud Management.
"Notice of Allowance Issued in European Patent Application No. 18726261.3", dated Aug. 25, 2022, 2 Pages.
U.S. Pat. No. 11,354,166, Jun. 7, 2022.
"Notice of Allowance Issued in European Patent Application No. 18726261.3", dated May 23, 2022, 7 Pages.
"Office Action Issued in Chinese Patent Application No. 201710335366.8", dated Mar. 3, 2022, 10 Pages.
"Fourth Office Action and Search Report Issued in Chinese Patent Application No. 201710335366.8", dated Nov. 18, 2022, 7 Pages. (W/o English Translation).
"Extended Search Report Issued in European Patent Application No. 22196317.6", dated Jan. 3, 2023, 9 Pages.

* cited by examiner

INTELLIGENT CLOUD MANAGEMENT BASED ON PROFILE

CLAIM OF PRIORITY

This application is a continuation of U.S. patent application Ser. No. 16/605,419 filed on Oct. 15, 2019, which is a U.S. National Stage Filing under 35 U.S.C. 371 of International Patent Application Serial No. PCT/US2018/028732, filed Apr. 21, 2018, and published as WO 2018/208472 A1 on Nov. 15, 2018, which claims priority to Chinese Application No. 201710335366.8, filed May 12, 2017, which applications and publication are incorporated herein by reference in their entirety.

BACKGROUND

As development of computer technique, cloud has been used in many fields. The term of "cloud" refers to a special IT resource, which may provide services including computation, data storage, information processing, and so on to remote cloud users based on network. The one who provides cloud resource may be a cloud provider, while the one who rents cloud resource may be a cloud tenant. In practical usage, the cloud tenant may be generally an institution, such as an enterprise or other organization, such as university, government, or the like. The cloud tenant may build its own business processing system with the rent cloud resource or do its own business processes based on a business system provided by a cloud provider, while the employees, i.e. the cloud users, of the institution may act as the cloud user of the cloud resource to process business of the institution, which includes business development based on cloud resources, business processing based on cloud resources, and maintenance of business system based on cloud resources, or the like. For example, a cloud tenant may be an e-business company and establish an internet sales platform with cloud resources rent from a cloud provider. The cloud resources supporting such internet sales platform may include a plurality of virtual servers, cloud databases, load balancer or other cloud resources. The employees of that e-business company may need to perform developing, maintenance and other business processing on the internet sales platform built on the cloud resource.

BRIEF SUMMARY

The embodiments of the present disclosure is provided to give a brief introduction to some concepts, which would be further explained in the following description. This Summary is not intended to identify essential technical features or important features of the subject as claimed nor to limit the scope of the subject as claimed.

A technical solution related to intelligent cloud management based profile is disclosed and applies Artificial Intelligence (AI) to cloud management and intelligently propose processing suggestions on cloud resource management. In daily work, behaviors for using cloud resources may show features of cloud users or cloud tenants themselves. The technical solution of intelligent cloud management of the present disclosure generates profile identifying cloud usage features by extracting cloud usage behavior data and intelligently proposes cloud management suggestions based on the profile.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

DETAILED DESCRIPTION

Figure 1:
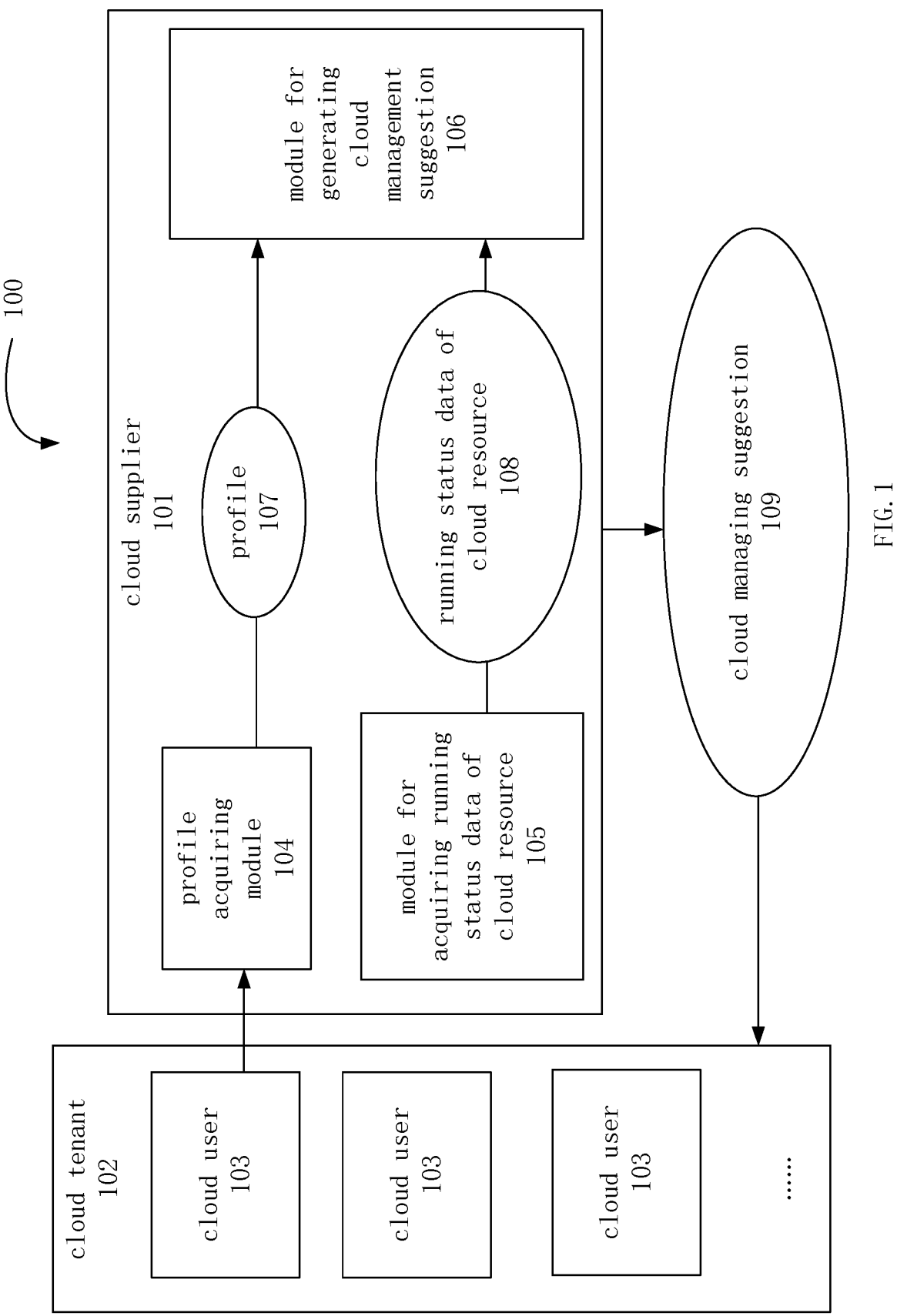
FIG. 1 is a block diagram of cloud management system.

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

Explanation for Terms

Cloud Provider: one providing cloud resources, e.g., Microsoft Axure, the cloud platform from Microsoft®, Ali Cloud from Alibaba®, and AWS cloud platform from Amazon.

Cloud Tenant: the cloud tenant is generally an institution, such as an enterprise or other organization, such as university, government, or the like. The cloud tenant may build its own business processing system with the rented cloud resource or do its own business processes based on a business system provided by a cloud provider.

Cloud User: people using cloud resources in cloud tenants. The usage of cloud resources by cloud users includes: developing and maintenance of business processing system based on cloud resources, processing business by using business processing system based on cloud resources, deployment and optimizing on the rented cloud resources and other usage. For example, when the cloud tenant is a company, the cloud users may be the employees of the company, i.e., engineers for developing and maintenance of systems, or salesmen for sales business of the company, or administrative staffs for human resource management in the company.

Cloud Resource: virtual computer resource provided to cloud tenants by cloud providers. In embodiments of the present disclosure, this term may be generally understood as including, for example, virtual machine resource, data storage resource, queue resource, data processing platform provided by a cloud provider, business processing system built by a cloud tenant based on rented resources such as virtual machines, databases, or the like, and so on.

In the present disclosure, term "technique" may refer to, for example, system(s), method(s), computer-readable instructions, module(s), algorithm, hardware logic (e.g., Field-Programmable Gate Array (FPGA)), Application Specific Integrated Circuit (ASIC), Application Specific Standard Parts (ASSP), System on Chip (SOC), Complex Programmable Logic Device (CPLD), and/or other technique allowable in the above context and the present disclosure.

Cloud technique (also referred as cloud computing technique) has been widely used in various fields. The cloud resource provider may provide services including computing, data storage, information processing, or the like to cloud tenants and cloud users within cloud tenants based on internet. On the side of cloud tenant, to perform various business based on cloud normally and efficiently, the cloud tenant may perform various cloud management operations on cloud. In embodiments of the present disclosure, cloud management refers to operations of monitoring and analyzing usage of cloud resources, configuring, adjusting and maintenance with respect to cloud resources based analyzing results or the like. For example, such operations may include monitoring quantity of business of a cloud tenant, and adjusting amount of virtual machines or processing capability of virtual machines based on changes of business amount. As another example, such operations may include performing internet safety defense on business system built based on cloud, monitoring internet attack, virus or other cases, and performing processing such as virus killing or defensing.

Cloud management itself is a very professional and complex processing, and it is necessary to prepare specific management solutions after comprehensive analysis on usage of cloud and then perform the specific cloud management operations. This requires the person in charge of cloud management to have very rich professional acknowledge about cloud, fully understanding on the architecture and running status of cloud resources, and even rich developing experience on cloud. This is the only way to prepare reasonable management solutions based on usage of cloud and perform the same. Therefore, in current cloud management scheme, cloud management is performed by professional technicians. Although there is some auxiliary software on cloud management, such software is merely auxiliary tools and works passively. More particularly, such software performs management operations such as monitoring, inquiring, and configuring only based on instructions, configuration and even programming by cloud users. Therefore, such software is a kind of passive cloud management based on instructions from cloud users.

Therefore, the embodiments of the present disclosure introduces a technical idea of AI into cloud management, and proposes a technical solution of cloud management, so as to offer a generating mechanism for pro-active and intelligent cloud management suggestions.

As shown in FIG. 1, which is a schematic block diagram of cloud management system 100 of an embodiment of the present disclosure. Cloud provider 101 provides cloud resources to a cloud tenant 102. A cloud user 103 of the cloud tenant 102 performs daily business processing by using cloud resources.

Profile acquiring module 104 of the cloud provider 101 may obtain behavior data in using cloud of the cloud user 103, perform analysis on the behavior data in using cloud of the cloud user 103, and generate profile 107 identifying cloud using characteristic of the cloud user 103 and/or the cloud tenant 102. On the other hand, a module 105 for acquiring running status data of cloud resource of the cloud provider 101 may acquire running status data of cloud resource 108 of cloud resources rented by the cloud tenant 102. A module 106 for generating cloud management suggestion of the cloud provider 101 may generate cloud management suggestions 109 according to profile 107 and running status data of cloud resource 108 and push the same to the cloud user 103 of the cloud tenant 102 so as to help the cloud user 103 in cloud management.

In the above system 100, the cloud provider 101 may include one or more cloud servers or cloud platforms for providing cloud resource services to cloud tenants 102. Operation systems or business processing system for cloud resource management may be installed on the cloud server or cloud platform. The cloud user 103 may use one or more servers, computer terminals, mobile terminals, or other devices to use cloud resources, and client software for connecting with cloud servers or cloud platforms of the cloud provider 101 may be installed on such devices.

In the above, general description has been made on the system architecture for cloud management of embodiments of the present disclosure. In the following, detailed description would be made on each main parts in FIG. 1 in connection with Figs.

Profile Acquiring Module

Figure 2:
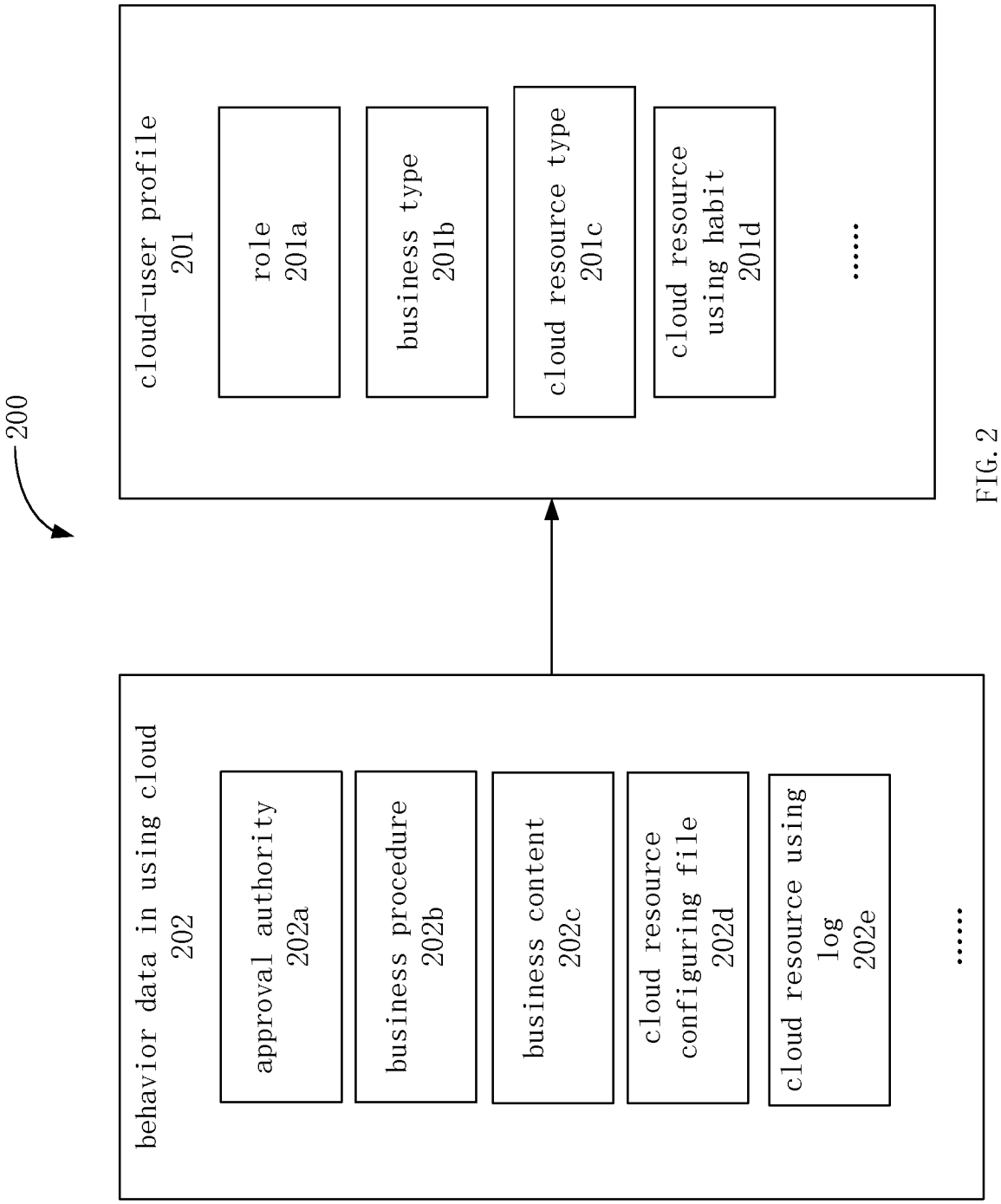
FIG. 2 is a schematic diagram showing generating of cloud-user profile of an embodiment of the present disclosure.
Figure 3:
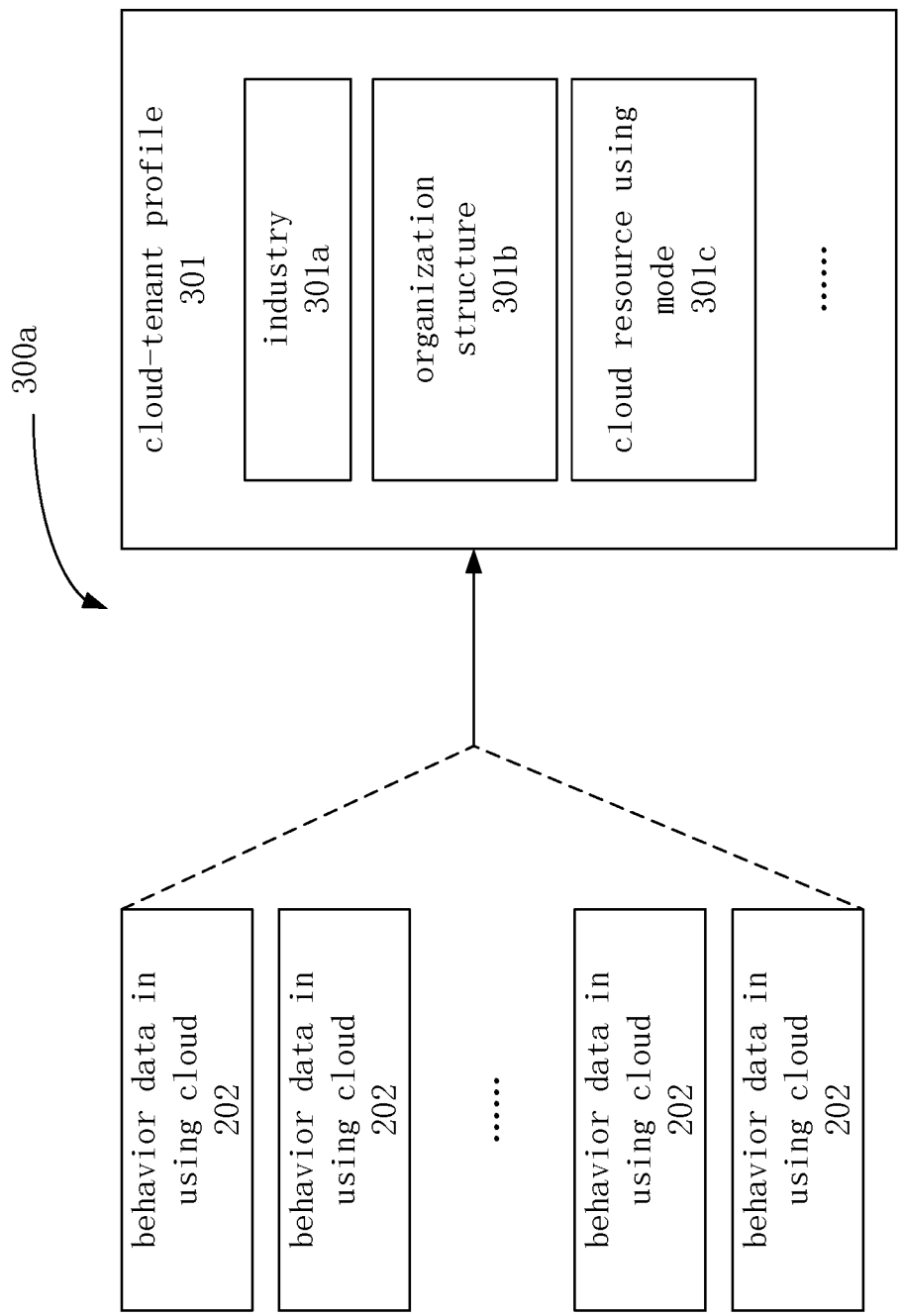
FIG. 3 is another schematic diagram showing another generating of cloud-tenant profile of an embodiment of the present disclosure.
Figure 4:
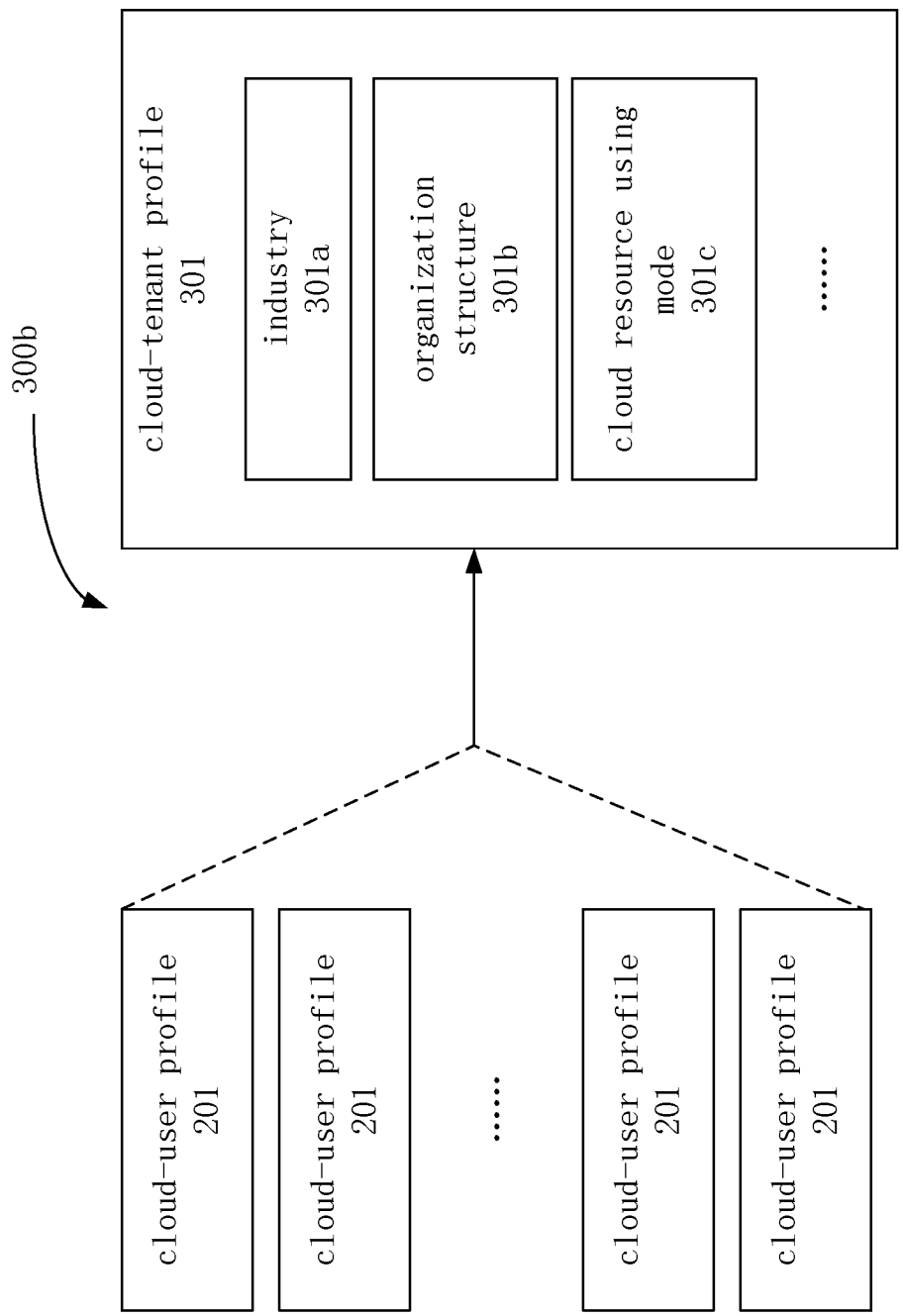
FIG. 4 is still another schematic diagram showing still another generating of cloud-tenant profile of an embodiment of the present disclosure.

The profile acquiring module 104 is configured to generate profile 107. Profile 107 may be generated by extracting features from the general behavior data in using cloud of the cloud tenant 102 or the behavior data in using cloud of a plurality of cloud users 103 of the cloud tenant 102. Such profile 107 shows nonrepresentational appearance for the cloud tenant 102 and/or the cloud users 103 of the cloud tenant 102 on the cloud. Such nonrepresentational appearance is related to a cloud tenant 102 or a cloud user 103, and is capable to show characteristic of the cloud tenant 102 or the cloud user 103 in cloud using behavior. As shown in FIG. 2 to FIG. 4, in some examples, the profile 107 may further include cloud-user profile 201 and/or cloud-tenant profile 301. The cloud user 102 rents cloud resources from the cloud provider 101, and then the cloud user 101 of the cloud tenant 102 may use the cloud resources. The behavior in using cloud cited herein may include all kinds of processing behaviors or operations based on cloud resources, e.g., business processing of business processing system based on cloud resources, system development and maintenance based on cloud resources, cloud management or the like. The cloud user 103 of the cloud tenant 102 cited herein refers to people authorized to perform operations on the cloud resources rented by the cloud tenant 102. For example, in a case the cloud tenant 102 is an enterprise, generally, the cloud user 103 may be an employee of the company. In some cases, the cloud user 103 may be someone outside of the company which has authorization. In general, the cloud user 103 cited herein refers to people who can access the cloud resources of the cloud tenant 102 and can perform operations on the cloud resources.

In some cases, the cloud resources rented by the cloud tenant 102 is actually used by the cloud user 103, and thus, both the cloud-user profile 201 and the cloud-tenant profile 301 may be acquired by extracting features from the behavior data in using cloud 202 of the cloud user 103. The profile 107 is kind of highly synoptically generated, and thus may be in a form of label. That is to say, the profile 107 may be specifically one or more labels showing cloud using characteristic. The profile 107 may identify the characteristic of the cloud tenant 102 and/or the cloud user 103 on the cloud in various feature aspects.

The cloud provider 101 may provide cloud resources to remote cloud tenants 102 via network. These cloud resources are not locally in the cloud tenant 102 or computers of the cloud users. All cloud using behaviors of the cloud user 103 of the cloud tenant 102 may be done by using the cloud resources on the side of cloud provider 101. The cloud provider 101 may monitor and record all the behavior data in using cloud 202 of the cloud user 103. Therefore, it is feasible to acquire the behavior data in using cloud 202 from a log file of a cloud operation system of the cloud provider 101, or a special monitoring module for cloud using behavior may be provided in a cloud server of the cloud provider 101 to monitor the cloud using behavior specifically and acquire the behavior data in using cloud 202. As an alternative embodiment, it is feasible to acquire the behavior data in using cloud 202 from a log file in a computer of the cloud user 103, or provide a monitoring module for cloud using behavior in a computer of the cloud user 103 to perform monitoring and recording on the cloud using behavior.

A technique of big data analyzing and machine learning technique may be used to extract profile 107 based on the behavior data in using cloud 202. Models of various labels may be preset and technique of data digging or semantic analyzing may be used to extract features, and then machine learning technique such as classifier may be used to classify labels so as to acquire the profile 107.

In the following, explanation would be made on the exemplary generating procedure 200 of cloud-user profile 201 in connection with FIG. 2. As shown in FIG. 2, which is a schematic diagram of a generating procedure 200 of cloud-user profile 201 of embodiments of the present disclosure, the cloud-user profile 201 may include following kinds of labels and each kind of label may be regarded as one feature aspect.

(1) label identifying role 201a of the cloud user 103: for example, position label in a company (high-level manager, middle-level, normal staff, or the like), job label in a company (salesman, administrative staff, engineer). In some examples, in a case that there is authorization obtained from the cloud tenant 102 and/or cloud user 103 for accessing its business data, position label may be extracted from approval authority 202a in a business processing procedure of the company, and job label may be extracted from business content 202c (including business documents, emails, working logs, or the like) processed by the cloud user. For example, main business documents processed by engineers may be technical documents (for example, design drawings, program codes, product developing files, or the like), while main business content of salesman may be business orders or various emails related to product sales, or the like. In other examples, the label of role 201a of cloud user may be acquired from role and/or authority function provided by the cloud platform. For example, the cloud platform of Azure of Microsoft may provide various account roles (e.g., administrator, service administrator, account administrator, cooperation administrator) and various using authority (e.g., r/w, read-only, contributor or the like). The cloud user 103 may self-define the role and/or authority, such as virtual machine administrator, storage read-only staff, or other roles, according to different needs of the company.

(2) label identifying business type 201b of business processed by the cloud user 103: for example, the business type of the business being processed may be purchasing and sales order business, overseas trade business, technique developing project, legal service project, or the like. In some examples, in a case that there is authorization obtained from the cloud tenant 102 and/or cloud user 103 for accessing its business data, these labels may be extracted from related documents of business content 202c. For example, the business type 201b of the business daily processed by a cloud user may be obtained by analyzing content of business documents or content of emails of the cloud user. In other examples, these labels may be extracted according to the business information provided when the cloud tenant 102 or the cloud user 103 signed order contract of cloud resources with the cloud provider 101, e.g., the name of the company is identified as e-business company.

(3) label identifying cloud resource type 201c used by the cloud user 103: for example, type of cloud service: cloud database service, virtual machine service, cloud storage service, mail service, and resource constitution mode of cloud resource: public cloud, private cloud and hybrid cloud. In some examples, such labels may be extracted from cloud resource configuring file 202d or cloud resource using log 202e of the cloud user 103.

(4) label identifying cloud resource using habit 201d of the cloud user 103: for example, system updating on off days, checking on health status of cloud resources upon starting work every day, using frequency of cloud resources. In some examples, such labels may be extracted from the cloud resource using log 202e.

In the above, exemplary introduction has been made on several aspects of cloud-user profile 201. It should be noted that, the cloud-user profile 201 shows characteristic in using cloud by a cloud user 103 (or in a perspective of cloud), and these characteristic are the ones appearing in a virtual environment of cloud rather than a real characteristic of the cloud user 103 in a physical environment. For example, some employee in a company offering legal consulting service (also is a cloud user 103) has a control authority of the highest level to cloud resources. From a view of cloud, the position label of this employee should be a high-level manager. However, in practical, in such company, the position label of this employee should be a system security maintenance staff. It can be seen that, the employee in a physical environment and the cloud user 103 in a cloud level may have totally different characters. However, in the embodiments of the present disclosure, the characteristic information showing in using cloud by a cloud user 103 is what should be concerned and a cloud management suggestion 109 of the specific cloud user 103 may be obtained by performing analyzing on these characteristic information. Such cloud management suggestion 109 may be pro-active and effective, and fully shows the conjunction application between AI and cloud management.

In the above, exemplary explanation has been made on content and obtaining of cloud-user profile 201. In the following, explanation would be made on the generating 300 of cloud-tenant profile 301 in connection with FIGS. 3 and 4.

Cloud-tenant profile 301 is abstractive generalization of cloud using behaviors of a cloud tenant 102. The cloud using behavior of the cloud tenant 102 is different from the cloud using behavior of the cloud user 103 as described above. More particularly, the cloud using behavior of the cloud user 103 may be a kind of individual behavior, while the cloud using behavior of the cloud tenant 102 may be a kind of using behavior in a view from the whole cloud tenant 102. The cloud using behavior of the cloud tenant 102 may be regarded as being consist of the cloud using behaviors of a plurality of (all of or some of) cloud users 103 of the cloud tenant 102. Therefore, the cloud using behavior of the cloud tenant 102 may be obtained by generalizing the cloud using behaviors of a plurality of cloud users 103 of the cloud tenant 102. The cloud-tenant profile 301 is obtained by further generalizing the cloud using behavior of the cloud tenant 102. Similarly with the cloud-user profile 201, the cloud-tenant profile 301 may be in a form of label and different label may show characteristics showing on cloud by the cloud tenant 102 in different feature aspects.

The cloud-tenant profile 301 may be generated by at least two ways as follows. As shown in FIG. 3, which is a schematic diagram showing a generating 300a of a cloud-tenant profile 301 of an embodiment of the present disclosure, in the generating 300a shown in FIG. 3, in some examples, the behavior data in using cloud 202 of a plurality of cloud users 103 of a cloud tenant 102 may be collected, and then the features of a plurality of behavior data in using cloud 202 may be extracted so as to obtain the cloud-tenant profile 301 showing characteristic of the whole cloud using behavior of the cloud tenant 102. As shown in FIG. 4, which is a schematic diagram showing another generating 300b of a cloud-tenant profile 301 of an embodiment of the present disclosure, in some examples, the features of the generated cloud-user profile 201 may be extracted so as to obtain the cloud-tenant profile 301.

Furthermore, as shown in FIG. 3 and FIG. 4, in some examples, the cloud-tenant profile 301 may include the following label, and each kind of label may be regarded as a feature aspect.

(1) industry label 301a identifying industry of cloud tenant 102: for example, a company may be classified into e-commercial industry, production and manufacture industry, consulting service industry, finance industry, technique developing industry, IT industry, or the like, and different label may be set for different industries.

As shown in FIG. 3, in a case that authorization has been obtained from a cloud tenant 102 and/or a cloud user 103 to access its business data, the industry label may be extracted from business contents 202c (including business documents, e-mails, working logs, or the like) processed by a plurality of cloud users 103 of the company. For example, it may be determined that a company is in a e-commercial business by analyzing the business documents to find that the business documents processed by most cloud users 103 of the company are mostly related to shopping on internet, and thus a label of e-commercial industry may be set. For another example, it may be determined a company is in a finance industry by analyzing the e-mails and business documents processed by the cloud users of the company to find most of the business documents and e-mails of the company are related to stocks and investment information and thus a label of finance industry may be set.

In another examples, industry label of the industry 301a of a cloud tenant may be extracted from an order contract of cloud resources signed by the cloud tenant 102 or a cloud user 103 with a cloud supplier 101. For example, the name of the company is identified as a finance company.

As shown in FIG. 4, as another way for generating the industry label of a cloud tenant 102, the industry label may be extracted from the label in cloud-user profile 201 of a plurality of cloud users 103. For example, in the description on the cloud-user profile 201, the business-type label of the business processed by the cloud user 103 is described and the industry 301a of the company may be determined by analyzing the business type label 201b of most cloud users 103 of the company. For example, if the business type label 201b of most cloud users 103 of the company is technique development, it may be determined that the company is in a technique development industry and an industry label of technique development may be set. Furthermore, the industry label of the cloud tenant 102 may be extracted from the label identifying the cloud user role 201a as described above. For example, if the position label of most cloud users 103 of the company is financial analyst, it may be determined that the company is in a finance industry and an industry label of finance may be set. Furthermore, the label identifying cloud resource using habit 201d of a cloud user 103 may be used to determine the industry 301a of the cloud tenant 102. For example, if most cloud users 103 of a company is set with a label of cloud resource using habit 201d of "updating system on off days", it may be concluded that the company is possibly in IT industry.

(2) label identifying the organization structure 301b on cloud of a cloud tenant 102, including, for example, label identifying whether the company has a vertical managing structure or horizontal managing structure, and which department is the core department among departments of the company and working relationship among departments, or the like.

Regarding such label on organization structure, in some examples, in a case that authorization has been obtained from a cloud tenant 102 and/or cloud user 103 to access its business data, such label may be extracted from an approval authority 202a of each cloud user 103, behavior data in using cloud 202 on business procedures or the like by each cloud user 103. The department information of each cloud user 103 may be obtained by analyzing different positions in business procedure 202b by each cloud user 103 and based on such department information, the organization structure 301b of the whole company may be extracted.

In some other examples, as mentioned above, the cloud platform may provide the cloud user 103 with different roles and/or authorization functions. For example, the cloud platform of Azure of Microsoft may provide different roles of account (e.g., administrator, service administrator, account administrator, cooperation administrator) and different using authorization (e.g., read/write, read-only, donator, or the like). The cloud user 103 may self-define roles and/or authorization according to needs of the company, e.g., administrator of virtual machine, memory read-only person and different roles. The organization structure 301b of a cloud tenant 102 may be obtained by performing analysis based on the roles and/or authorization of the cloud users 103.

Furthermore, in some examples, the label of organization structure 301b may be directly extracted based on label of each cloud user 103. As described above, each cloud user 103 is identified with role label 201a, based on which each department information may be obtained and the organization structure 301 of departments may be further generated.

(3) label identifying cloud resource using mode 301c of cloud tenant 102. In some examples, the cloud resource using mode 301c may include service types of the cloud services used by a cloud tenant 102 including cloud database service, virtual machine service, cloud storage service and the like, and resource constitution mode of cloud resource: public cloud, private cloud and hybrid cloud.

The label of cloud resource using mode 301c may be extracted from cloud resource configuring file 202d or cloud resource using log 202e of a plurality of cloud users 103. The label of cloud resource using mode 301c may be also directly extracted based on label of cloud resource using mode 301c of each cloud user 103.

Exemplary description is made on some aspects of cloud-tenant profile 301 in the above. It should be noted that, the cloud-tenant profile 301 mainly shows characteristic of a cloud tenant 102 reflected on cloud (or in a perspective of cloud), and these characteristic are features shown in a virtual environment of cloud and not the real characteristic of cloud tenant 102 in a physical environment. For example, a company is a commercial company in a physical environment, but the company is a company in IT industry not commercial industry from a perspective of cloud, since the company has rented a lot of cloud resources as a cloud tenant 102 for development of commercial platform system.

The above various label is merely an exemplary example based on technical idea of the present disclosure. In practice, various label may be defined flexibly according to feature of cloud resources of cloud tenant 102, cloud user 103 and cloud supplier 101 so as to generate abstract information identifying features in cloud using by cloud users 103 and cloud tenants 102 more effectively.

In the above, description has been made on exemplary content and generating ways for cloud-user profile 201 and cloud-tenant profile 301.

Therefore, in the embodiments of the present disclosure, the above cloud-user profile 201 and cloud-tenant profile 301 are both generalized based on behavior data in using cloud 202, and intelligent and pro-active cloud management suggestion 108 may be provided for cloud tenant 102 and cloud user 101 only based on profile 107 from a perspective of cloud (which adequately shows information on cloud using characteristic).

Module for Obtaining Running Status Data of Cloud Resource

Figure 5:
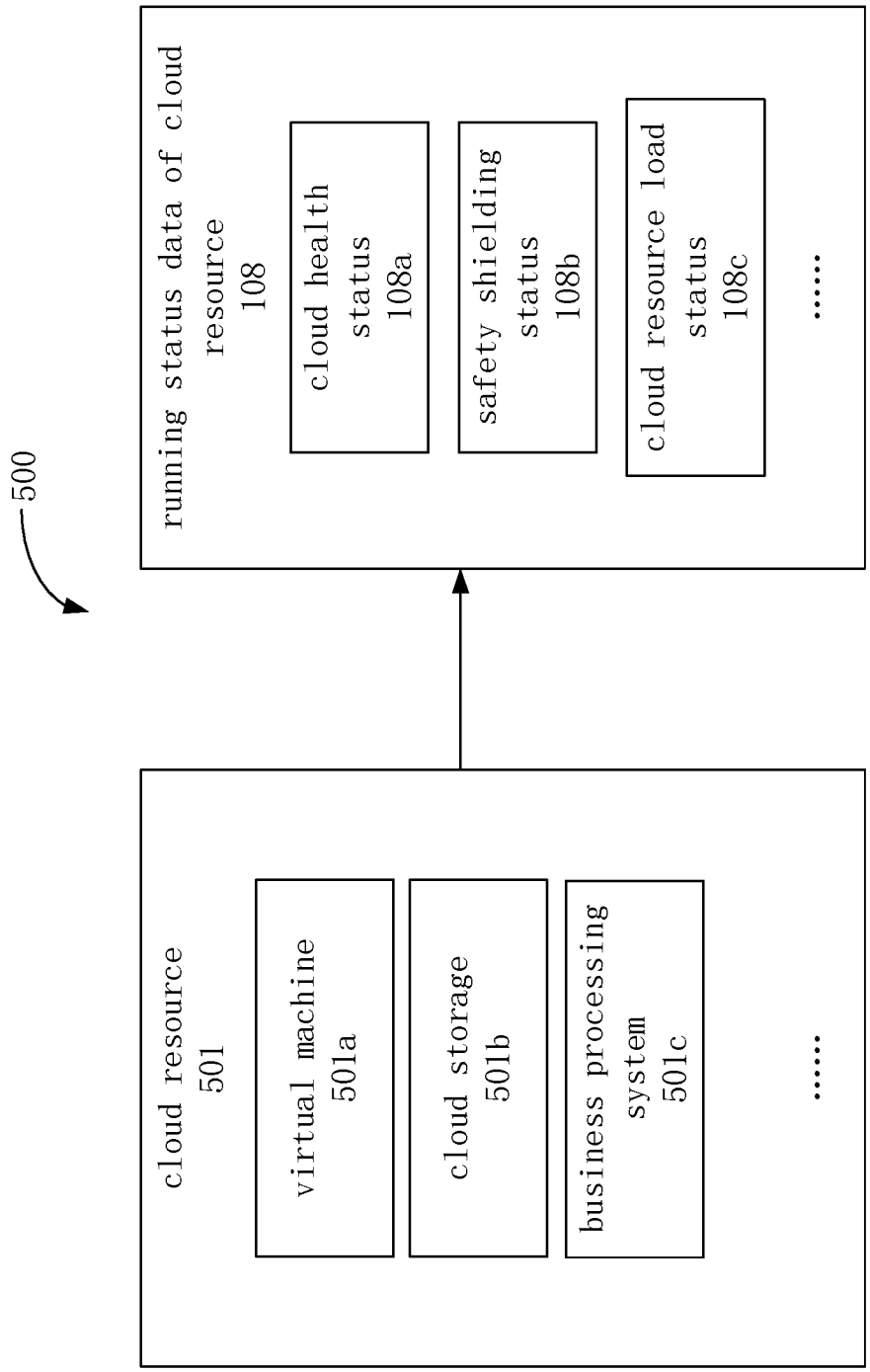
FIG. 5 is a schematic diagram showing generating of running status data of cloud resource of an embodiment of the present disclosure.

The module 105 for obtaining running status data of cloud resource may be configured to monitor the running status of cloud resources and generate running status data of cloud resource 108. As shown in FIG. 5, which is a schematic diagram showing generating 500 of running status data of cloud resource 108 of an embodiment of the present disclosure, the running status data of cloud resource 108 refers to the running status data of a cloud resource 501 rented by a cloud tenant 102 during business processing. In some examples, the running status data of cloud resource 108 may include: cloud health status 108a, safety shielding status 108b of a business processing system built on cloud resources, cloud resource load status 108c, and the like. The cloud resources 502 monitored by the module 105 for obtaining running status data of cloud resource may include: virtual machine 501a, cloud storage 501b, business processing system 501c, and the like.

The cloud resources 501 may be located on the side of a cloud supplier 101, and thus the cloud supplier 101 may perform monitoring on the running status of cloud resources 501. More particularly, a cloud server of the cloud supplier 101 may monitor the cloud resources 501 and generate running status data of cloud resource 108.

Furthermore, in some examples, as an alternative embodiment, the running status of cloud resources 501 may be monitored on the side of the cloud tenant 102. Accordingly, the running status data of cloud resource 108 may be generated on the side of the cloud tenant 102. More particularly, a local computer of a cloud tenant 102 may monitor the cloud resources 501 used by the cloud tenant 102 and generate running status data of cloud resource 108.

Module for Generating Cloud Management Suggestion

Figure 6:
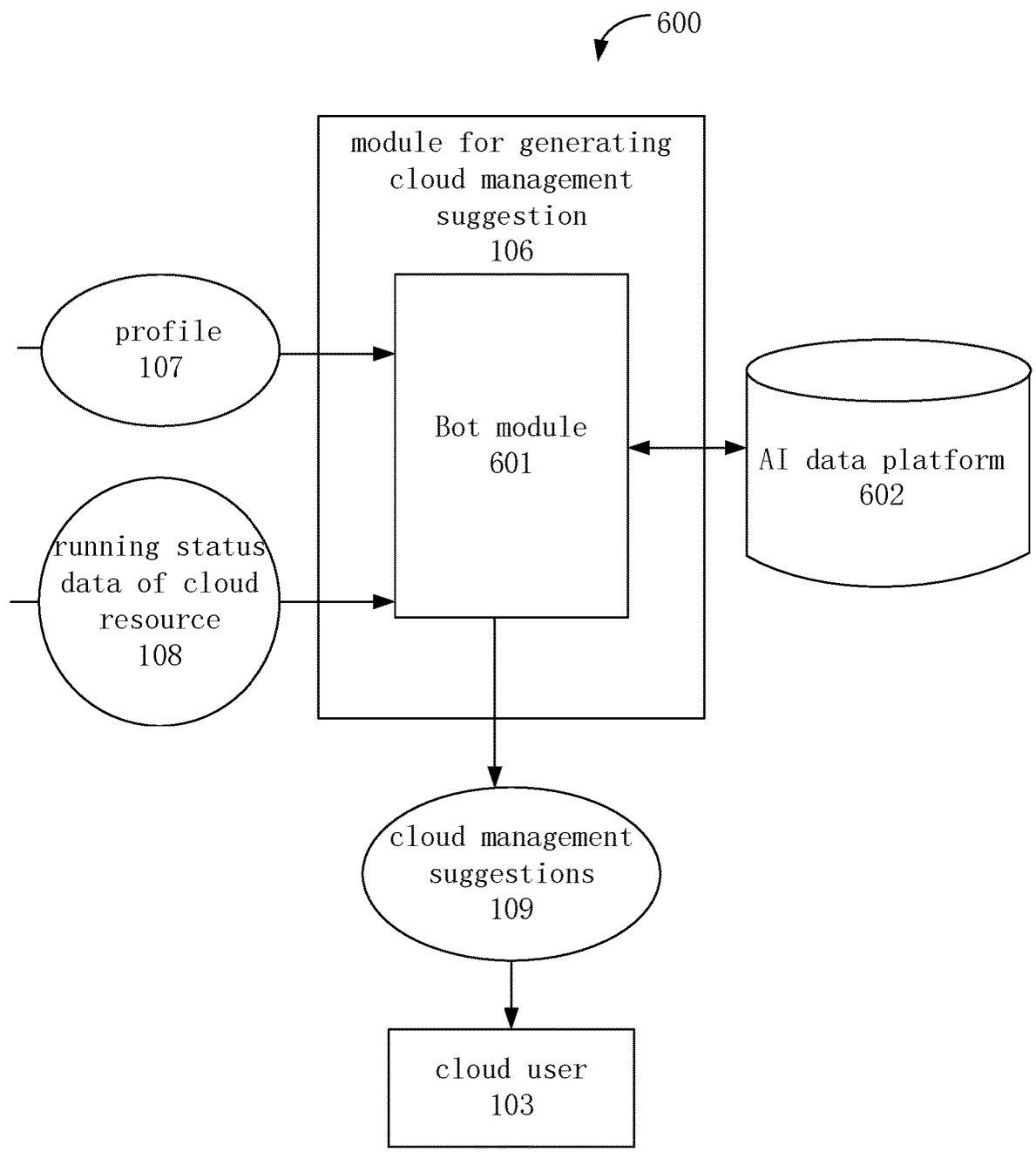
FIG. 6 is a block diagram of a module for generating cloud management suggestion of an embodiment of the present disclosure.

The module 106 for generating cloud management suggestion may be configured to generate cloud management suggestion 109 according to profile 107 and running status data of cloud resource 108. FIG. 6 is a block diagram 600 of a module 106 for generating cloud management suggestion of an embodiment of the present disclosure.

In some examples, the module for generating cloud management suggestion may be configured to generate cloud management suggestion 109 by using a Bot (robot) module 601. In embodiments of the present disclosure, the Bot module 601 may refer to an artificial intelligent (AI) module built on an AI data platform. In some cases, the Bot may be in a form of Chatbot, which may talk with user in a way of conversation by imitating humans, answer questions from users based on the support from a strong AI data platform 602 on the background, and propose various suggestions to users according to conversation with users.

The Bot module 601 may access the AI data platform to obtain proposing cloud management suggestion after acquiring the profile 107 and running status data of cloud resource 108. That is to say, the profile 107 and running status data of cloud resource 108 are input information of the Bot module 601, and the processing suggestion 108 on cloud management is output information of Bot module 601.

Figure 7A:
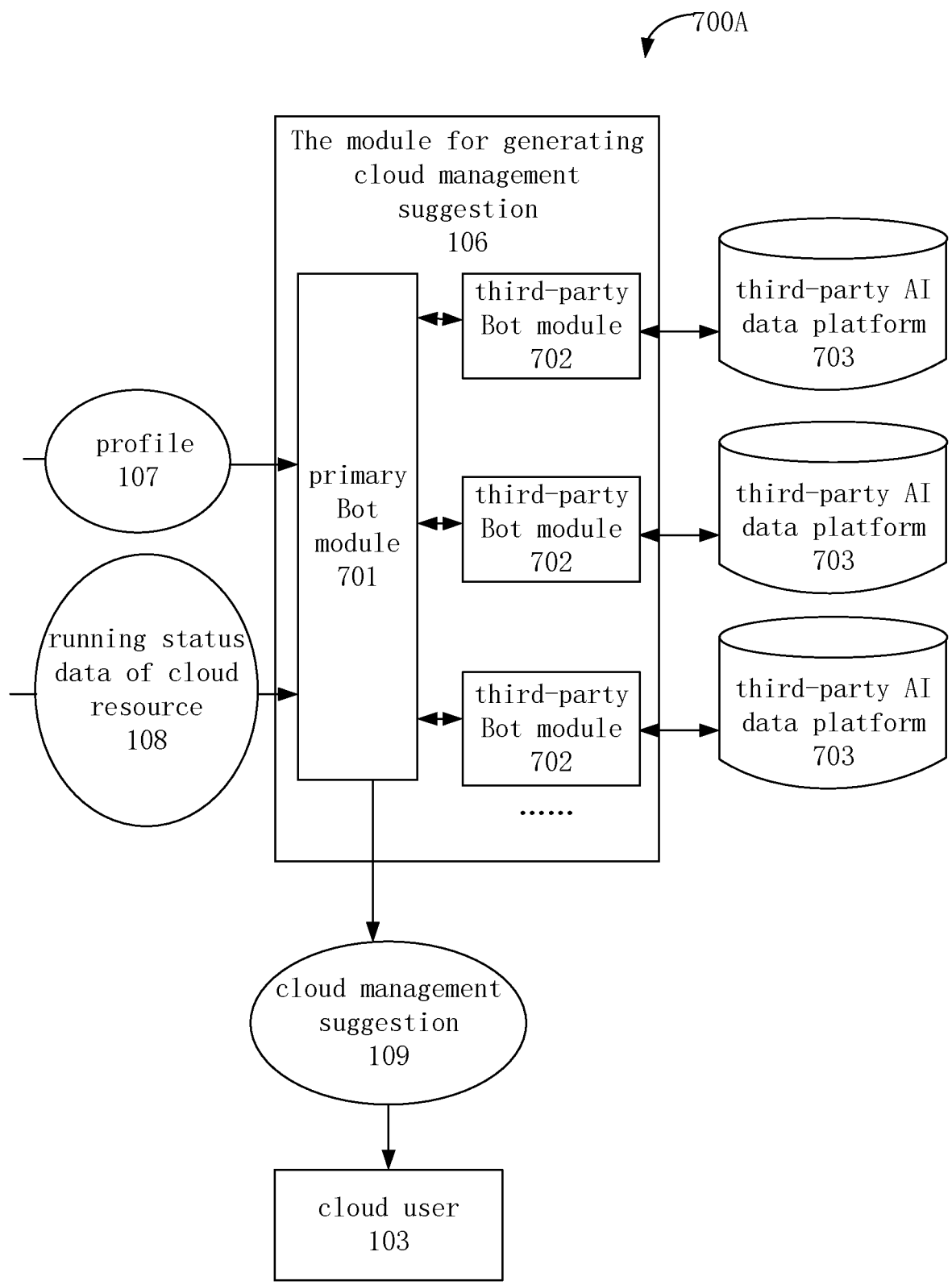
FIG. 7A is another block diagram of a module for generating cloud management suggestion of an embodiment of the present disclosure.

In some examples, to acquire more professional cloud management suggestion 109, a third-party Bot module 702 may be used to generate cloud management suggestion 109. FIG. 7A is another block diagram 700A of a module 106 for generating cloud management suggestion of an embodiment of the present disclosure.

In the block diagram 700A, a primary Bot module 701 may be provided and connected to a plurality of third-party Bot modules 702. The plurality of third-party Bot modules 702 may have different functions, and each third-party Bot module 702 may be corresponding to a third-party AI platform, respectively. In some examples, the third-party Bot module 702 may include a Bot for monitoring and analyzing virtual-machine, a Bot for scanning and analyzing bugs, and a Bot for providing industry solutions.

The primary Bot module 701 may send the acquired profile 107 and running status data of cloud resource 108 to the third-party Bot module 702, and the third-party Bot module 702 may perform analysis on the profile 107 and running status data of cloud resource 108 to extract information as needed, and then generate processing suggestion 109 on cloud management by means of related third-party AI data platform 703 and send the same to the primary Bot module 701. The primary Bot module 701 may provide the processing suggestion 109 on cloud management to the cloud users 103 in a pro-active way, after the primary Bot module 701 receives the processing suggestion 109 on cloud management from the third-party Bot module 702. The above primary Bot module 701 and each third-party Bot module 702 may be provided in a server of cloud supplier 101 in a way of Plug-able Bot module, or provided in a server of a cloud tenant 102 or a computer of a cloud user 103. It should be noted that, each third-party Bot module 702 may be supported by AI data platform 703 of third-parties, so that the third-party Bot modules 702 may use resources of third-parties to provide intelligent cloud management suggestion 109 according to the profile 107 and running status data of cloud resource 108 sent by the primary Bot module 701.

In the block diagram 700A, uniform interface standard may be designed and each third-party Bot module 702 may follow that interface standard so as to identify the information formats of the profile 107 and running status data of cloud resource 108 acquired by the primary Bot module 701 and return cloud management suggestion 109 recognizable by the primary Bot module 701 and then the primary Bot module 701 may push the cloud management suggestion 109 to the cloud users 103 in a form of conversation.

In view that there are various kinds of third-party Bot modules 702, in some examples, it may be unnecessary to require the third-party Bot module 702 to follow uniform interface standard. In such case, the primary Bot module 701 may perform the conversion of the interface standards. More particularly, the primary Bot module 701 may convert profile 107 and running status data of cloud resource 108 to a data format which is recognizable to a selected third-party Bot module 702 according to the third-party Bot module 702 after the primary Bot module 701 acquires the profile 107 and running status data of cloud resource 108, and the primary Bot module 701 may send the profile 107 and running status data of cloud resource 108 in converted data format to the third-party Bot module 702. The primary Bot module 701 may perform recognition on the cloud management suggestion 109 returned by the third Bot module 702 upon receiving it, and generate a processing suggestion conforming to the format of information of the primary Bot module 701 and push to cloud users 103 in a manner of conversation.

In some examples, the primary Bot module 701 may select a suitable third-party Bot module 702 according to the profile 107 and running status data of cloud resource 108 to provide cloud management suggestion 109. For example, the profile 107 required by a primary Bot module 701 may involve a cloud tenant 102 in IT industry and the cloud resources mainly used by the cloud tenant 102 may be of virtual-machine service. According to the running status data of cloud resource 108, the business processing system built by this company based on virtual machine has been hacked frequently. Based on such information, the primary Bot module 701 may preferably select a third Bot module 702 providing analysis on network safety to provide cloud management suggestion 109.

Furthermore, in some examples, the primary Bot module 701 may acquire feedback information via conversation with cloud users 103 so as to rank respective third-party Bot module 702, which may be used as critical for selecting third-party Bot module 702.

Figure 7B:
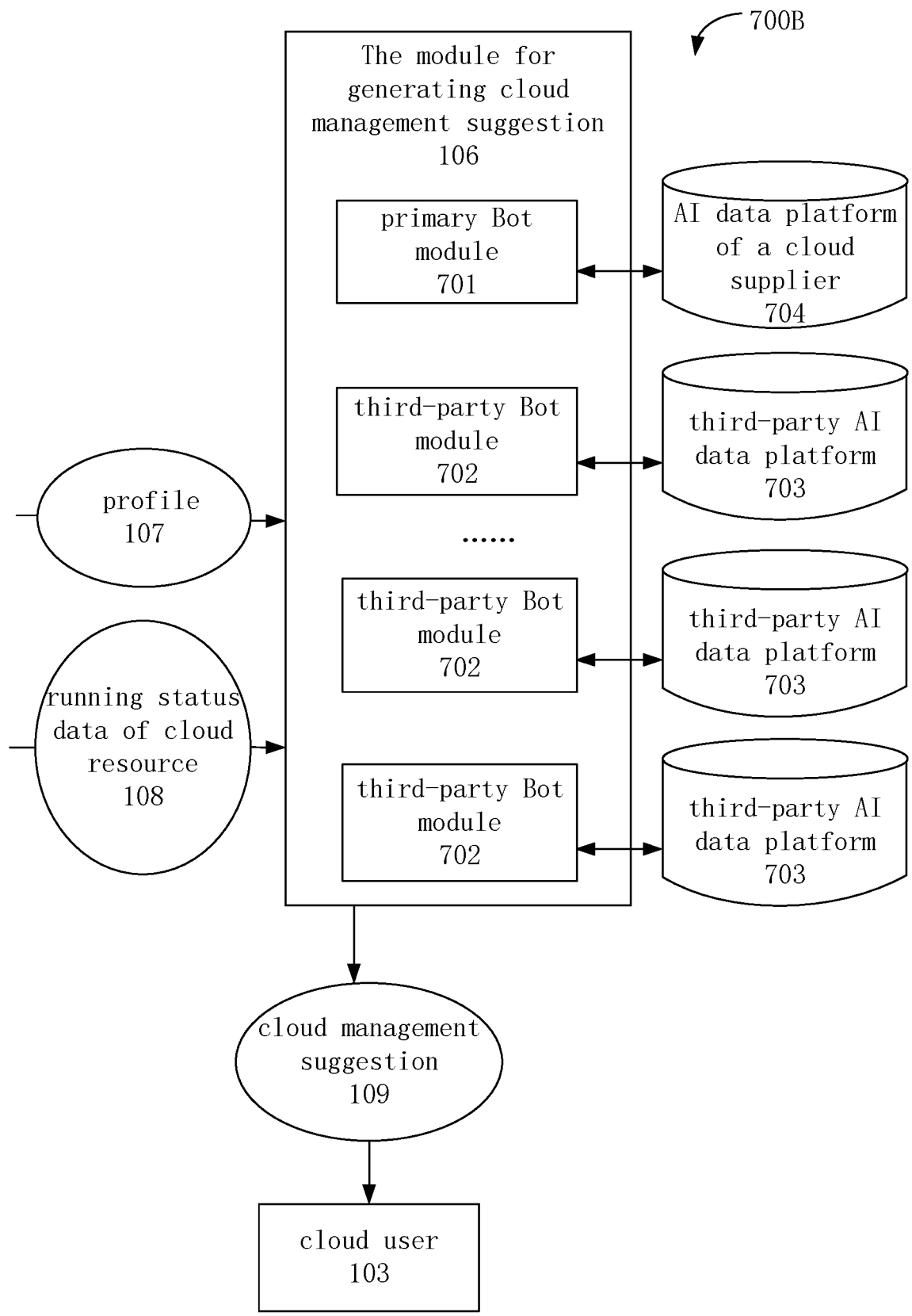
FIG. 7B is still another block diagram of a module for generating cloud management suggestion of an embodiment of the present disclosure.
Figure 8:
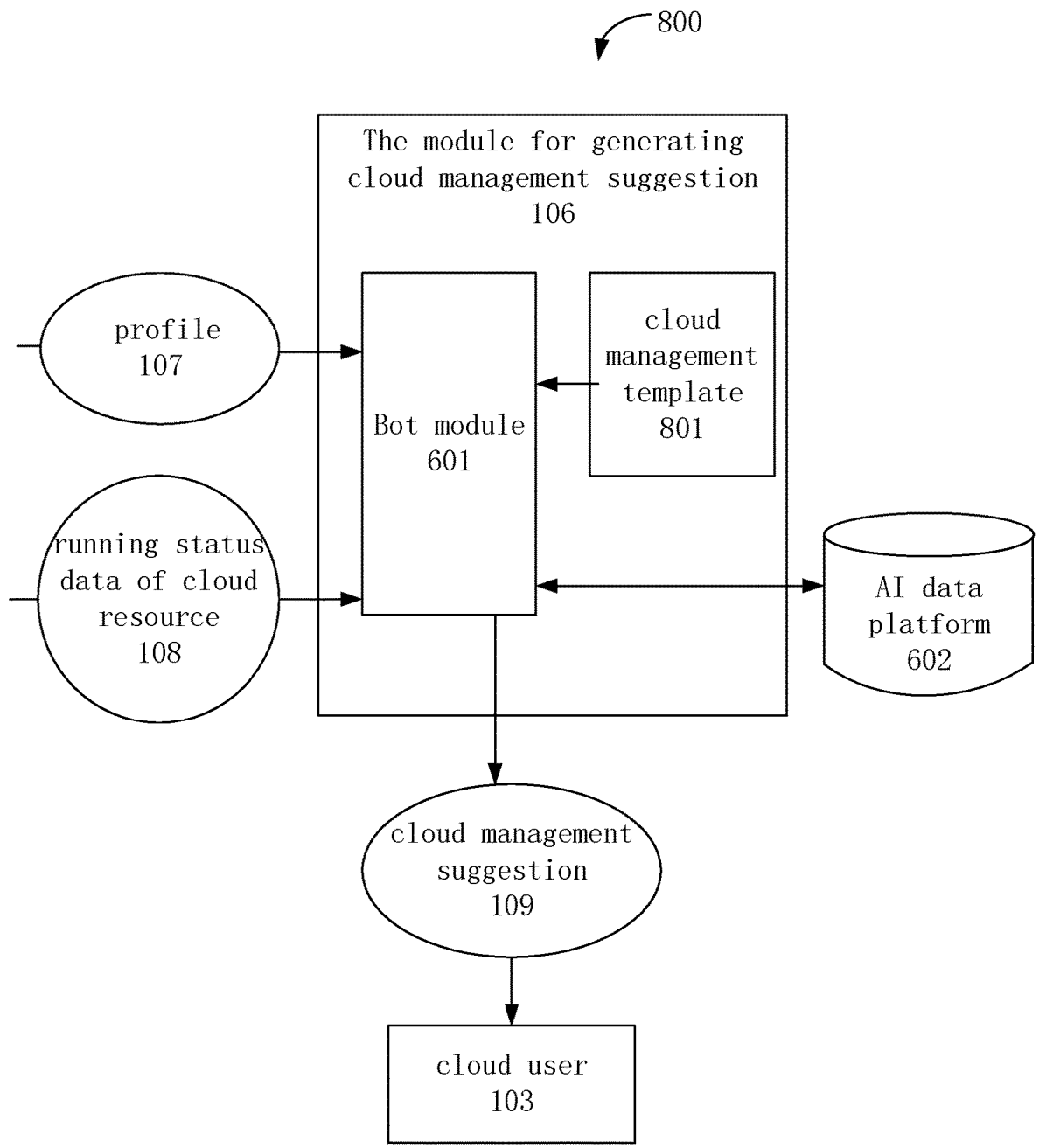
FIG. 8 is still another block diagram of a module for generating cloud management suggestion of an embodiment of the present disclosure.

In some examples, the structure of the block diagram 700B in FIG. 7B may be adopted. In block diagram 700B, a primary Bot module 701 and a third-party Bot module 702 are in a parallel structure, in which the primary Bot module 701 may first receive profile 107 and running status data of cloud resource 108, and then perform analysis on the profile 107 and the running status data of cloud resource 108 so as to determine whether or not the primary Bot module 701 may be able to generate cloud management suggestion 109. If so, the primary Bot module 701 may directly access an AI data platform 704 of a cloud supplier corresponding thereto to obtain cloud management suggestion 109, and push the same to a cloud user 103 in a way of conversation. If it is determined that the primary Bot module 701 cannot generate or is unsuitable for generating cloud management suggestion 109 upon analysis on the profile 107 and running status data of cloud resource 108, the profile 107 and running status data of cloud resource 108 may be sent to other third-party Bot module 702 capable to generate cloud management suggestion 109, and the third-party Bot module 702 may acquire cloud management suggestion 109 from the third-party AI data platform 703 corresponding thereto and push the same to a cloud user 103 in a way of conversation. In the above, description has been made on a technical solution for generating cloud management suggestion 109 with Bot module 601. Based on the above technical solution, the cloud user 103 may preset cloud management templates 801 in advance and the content of cloud management suggestion 109 may be customized or guided through these cloud management templates. As shown in FIG. 8, which is still another block diagram 800 of a module 106 for generating cloud management suggestion of an embodiment of the present disclosure, compared with diagram 600, in the diagram 800, a cloud management templates 801 may be added and may recite preset management matters and/or related parameters of management matters therein.

Figure 9:
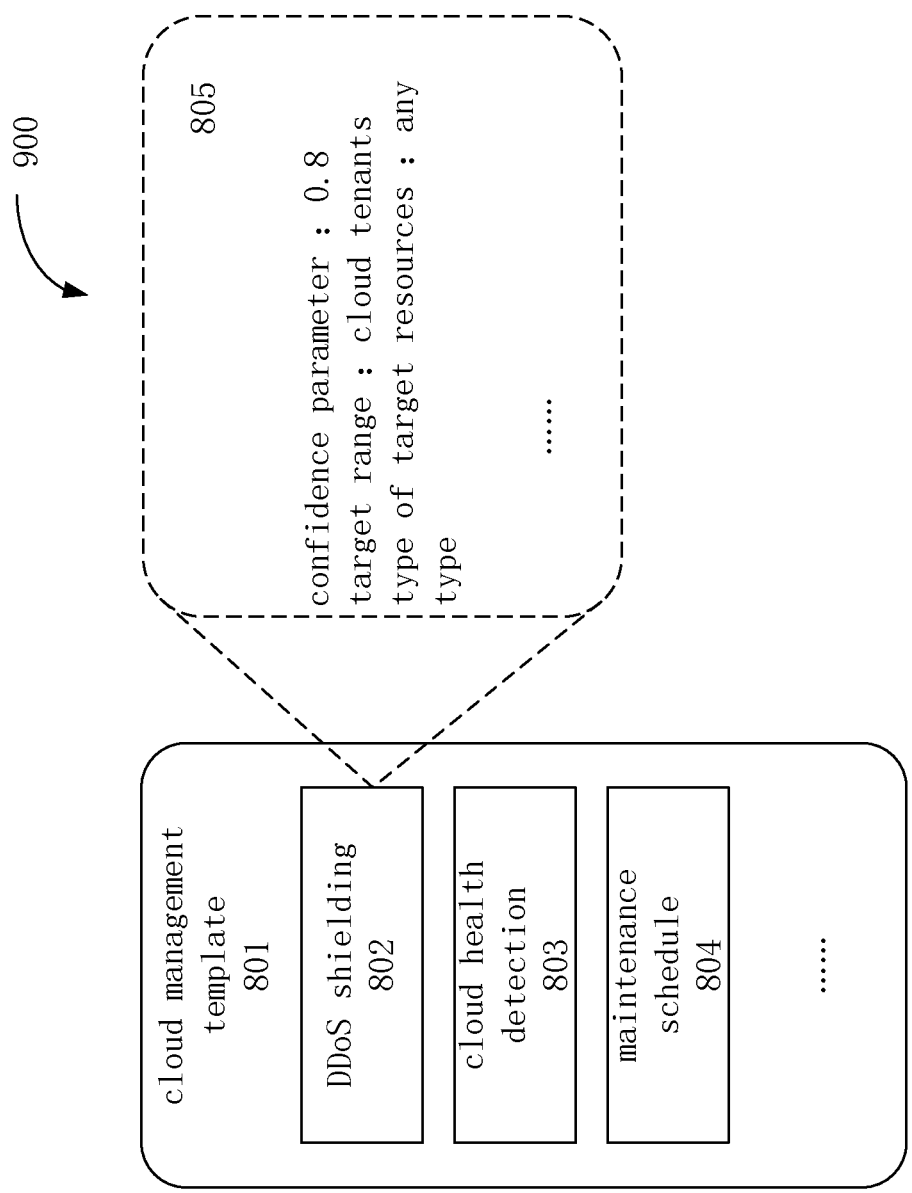
FIG. 9 is a block diagram showing cloud management templates of an embodiment of the present disclosure.

As shown in FIG. 9, which is a block diagram 900 showing content of cloud management templates 801 of an embodiment of the present disclosure, in the block diagram 900, the cloud management templates 801 may make pre-settings on DDoS shielding 802, cloud health detection 803 and maintenance schedule 804 and the like. For example, regarding DDoS shielding 802, the settings may include: confidence parameter is 0.8, which means the alert should be triggered upon an event has reached the confidence parameter; target range is all cloud tenants, which means DDoS shielding should be monitored with respect to cloud resources of cloud tenants; type of target resources is any type, which means DDoS shielding should be monitored with respect to all types of resources.

In a case that cloud management templates 801 are preset, cloud management suggestion 109 may be generated according to profile 107, running status data of cloud resource 108, and cloud management templates 801. In some examples, the cloud management templates 801 may be parameter settings for Bot module 601 (e.g., confidence parameter against predicted threatens, and alert processing suggestion would be made only when the confidence parameter is passed), or managing terms requiring attention of Bot module 601 (e.g., cloud health should be paid more attention to).

In some examples, cloud management templates 801 may be in a form of program script, or set in association with primary Bot module 701 or third-party Bot module 702, so as to make adjustment to the running of programs of the primary Bot module 701 or other third-party Bot module 702.

The module 106 for generating cloud management suggestion may provide cloud management suggestion 109 to cloud users 103, after generating the same, so as to guide the cloud users on cloud managing operations. In some examples, cloud management suggestion 109 may be provided to cloud users 103 in a pro-active way. For example, conversation window would be popped up on the computer or mobile terminal of a cloud user 103 so as to enter a conversation-interactive mode with the cloud users. The conversation may be initiated by the Bot module 601 in the block diagram 600 or the primary Bot module 701 in the block diagram 700A or 700B. The conversation cited herein may refer to a conversation, which is actively initiated according to the monitoring on cloud resource running status, instead of passively waiting for instructions input by cloud users 103 or acquiring cloud management suggestions in other ways. Such mechanism of providing cloud management suggestion 109 to cloud users 103 in a pro-active way significantly shows the technical idea of combining cloud management with AI.

In some examples, cloud management suggestion 109 may include: one or more information among alert processing suggestion with respect to cloud management, optimizing processing suggestion, predicted processing suggestion and the like.

Alert processing suggestion: to find problems or risks in using of cloud resources based on running status data of cloud resource 108 and profile 107, and therefore this information may provide processing suggestion for solving such problems or risks.

Optimizing processing suggestion: to find optimizable parts in using cloud resources based on running status data of cloud resource 108 and profile 107, so that the cloud resources may be used more efficiently, and therefore, this information may provide processing suggestion on optimizing using of cloud resources.

Predicted processing suggestion: to predict possible problems in the future based on running status data of cloud resource 108 and profile 107, so as to provide processing suggestion on states possibly occurring in the future, e.g., how to adjust the using of cloud resources.

In some examples, the conversation initiated by the primary Bot module 701 may be dynamically adjusted according to information input by cloud users 103. After the primary Bot module 701 provides cloud management suggestion 109 to cloud users in a way of conversation, the primary Bot module may further acquire information input by cloud users 103 during subsequent conversation, and acquire new cloud management suggestion 109 according to profile 107, running status data of cloud resource 108 and input information during conversation. During obtaining new cloud management suggestion 109, the primary Bot module 701 may adjust the selected third-party Bot module 702 according to information input by cloud users 103, so as to provide further processing suggestion more conforming needs of cloud users 103.

More particularly, during above conversation, input information during conversation may include one or more of context information of conversation, voice information of cloud user 103, emotion information of cloud user 103, environment information of cloud user 103, time information. That is to say, during conversation, not only context information input in a form of characters may be acquired, but information which is available via terminal of cloud user 103 or other sensors may be also acquired, so that determination may be made more efficiently on needs of cloud users 103 so as to provide more effective cloud management suggestion 109.

Embodiments of Applications

In the above, description is made on functions and implementation of each part of intelligent cloud management. In the following, further explanation would be made on technical solution of intelligent cloud management with embodiments of specific applications.

Figure 10:
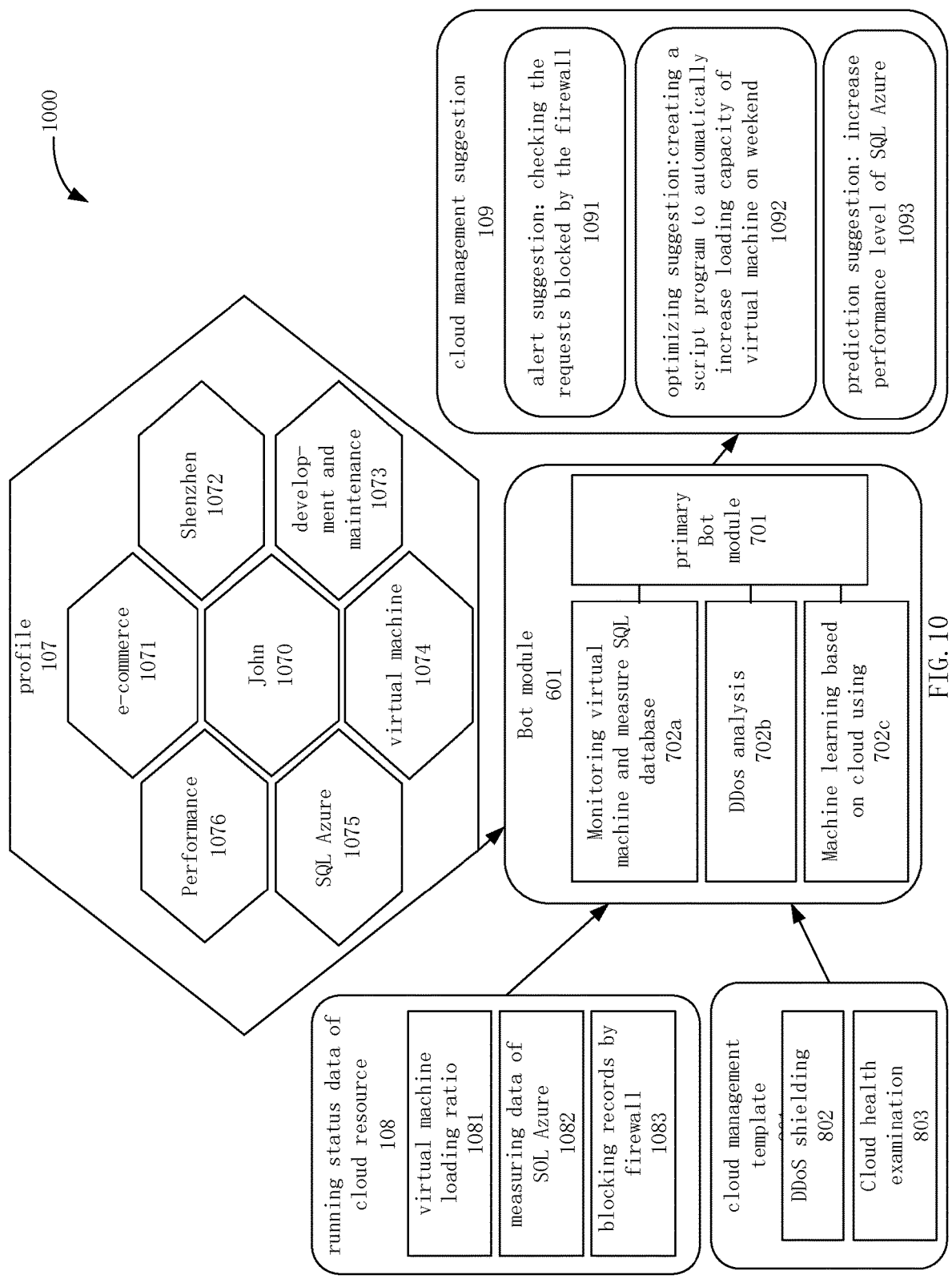
FIG. 10 is a scenario in which the embodiments of the present disclosure may be applied.

In the following, description would be made on technical solution of embodiments of the present disclosure with an embodiment. FIG. 10 is an application scenario 1000 of an embodiment of the present disclosure. With an employee 1070 named "John" (cloud user 103) as an example, John is hired by an e-commercial company located in Shenzhen (cloud tenant 102), and his job is mainly development and maintenance with virtual machine as cloud resource, and thus performance of virtual machine is highly required. With respect to cloud user 103 such as John, cloud management suggestion 109 may be generated in the following four aspects.

(1) Profile 107

As Shown in the Drawings, Behavior Data in Using Cloud of John May be Generalized as six pieces of label of cloud-user profile 201: "e-commerce" 1071 (label identifying industry type), "Shenzhen" 1072 (label identifying working location), "development and maintenance" 1073 (label identifying job type), "virtual machine" 1074 (label identifying specific cloud resource being used), "SQL Azure" 1075 (label identifying type of cloud service), "Performance" 1076 (label identifying requirement on cloud resources). More particularly, SQL Azure is relation database service running cloud computation built on Windows Azure cloud operation system. In the above label as profile 107, there is part of label is also as label of cloud-tenant profile 401 of the company (as cloud tenant) where John is located, e.g., "e-commerce" 1071 and "Shenzhen" 1072. In the present embodiment, it may be also regarded that the cloud management suggestion 109 is made based on cloud-user profile 201 and cloud-tenant profile 301.

(2) Bot Module 601

According to profile of John (e.g., "e-commerce" 1071, "development and maintenance" 1073, "performance" 1076, and "SQL Azure" 1075), the primary Bot module 701 may select and use the following kinds of third-party Bot module 702.

Monitoring virtual machine and measure SQL database 702a: for monitoring virtual machine and measuring performance index of SQL database according to running status data of cloud resource (such as loading status of virtual machine, read/write speed of SQL database, or the like), and providing configuration management suggestion on virtual machine and SQL database in connection with profile (e.g., attention has been paid to "performance" 1076 and the job type is "development and maintenance" 1073);

DDos (Distributed Denial of Service) analysis 702b: for performing analysis on DDoS attacking according to running status data of cloud resource (records of attacks blocked by firewall), and providing suggestions on protection strategy for e-commerce in connection with profile 107 of John (e.g., industry label of "e-commerce" 1071);

Machine learning based on cloud using 702c: for performing machine learning on running status data of cloud resource (running status data of cloud resource during each period in the past one year) and profile 107 of John (e.g., industry label of "e-commerce" 1071 and label of used cloud service of "SQL Azure" 1075) to generate prediction data on cloud resource running status for a period in the future, and generate management suggestion for making adjustment on cloud resources based on such prediction data. On the other hand, a third-party Bot module 702 having rich knowledge on some industry may be generated by big data analysis on behavior data in using cloud 202 of such industry.

(3) Cloud Management Templates 801

John may customize cloud management templates 801 according to his needs, which may include templates of the following two types:

DDos shielding 802, which may define shielding level, programs to be monitored preferably, or the like;

Cloud health detection 803, which may define time and frequency and regions, which need more attention to be paid to, for performing cloud health detection.

(4) Running Status Data of Cloud Resource 108 Acquired by Monitoring

Running status data of cloud resource 108 may include various kinds of logs such as virtual machine loading ratio 1081, measuring data of SOL Azure 1082, blocking records by firewall 1083. These running status data of cloud resource 108 may be used as basis for the Bot module 601 to generate cloud management suggestion in combination with profile 107 and cloud management templates 801.

Cloud management suggestion 109 in the following aspects may be generated based on the technical contents in the above four aspects and be pushed to John in a way of pro-active conversation:

(1) alert suggestion 1091: a third-party Bot module 702 may extract measuring data of SQL Azure by analysis on running status data of cloud resource, and with analysis on such measuring data, it is found that, there are several request blocked by the firewall in the past few hours. Therefore, a conversation may be actively initiated to suggest John checking whether or not the requests blocked by the firewall is incorrect operations or invasion threats.

(2) optimizing suggestion 1092: a third-party Bot module 702 may perform analysis on data of loading status of virtual machine and find that the CPU of the virtual machine is in a high loading ratio of 70%-80% on weekend. Therefore, a conversation may be actively initiated to suggest John creating a script program to automatically increase loading capacity of virtual machine on weekend and automatically decrease loading capacity of virtual machine after weekend.

(3) prediction suggestion 1093: a third-party Bot module 702 may perform analysis and find that the company where John is in is labeled with an industry label of "e-commerce" 1071, and predict that there would be an order rush from November to December based on big data analysis on industry of "e-commerce" 1071 by the third-party Bot module 702. Therefore, John may be suggested maintaining current loading capacity of virtual machine and increasing performance level of SQL Azure so as to deal with the potential bottleneck of performance.

Upon obtaining suggestions in the above three-aspects, John may make effective management on cloud resources being used and solve problems and risks in cloud resources more effectively, optimize configuration of cloud resources, and make deployment of cloud resources against possible circumstances in the future in advance.

These processing suggestion may be pro-actively proposed to John without deep understanding of John on running of cloud resources. It may be only necessary for John to perform operations according to cloud management suggestions provided in conversation and greatly decrease difficulty of cloud management.

Exemplary Embodiments

Figure 11:
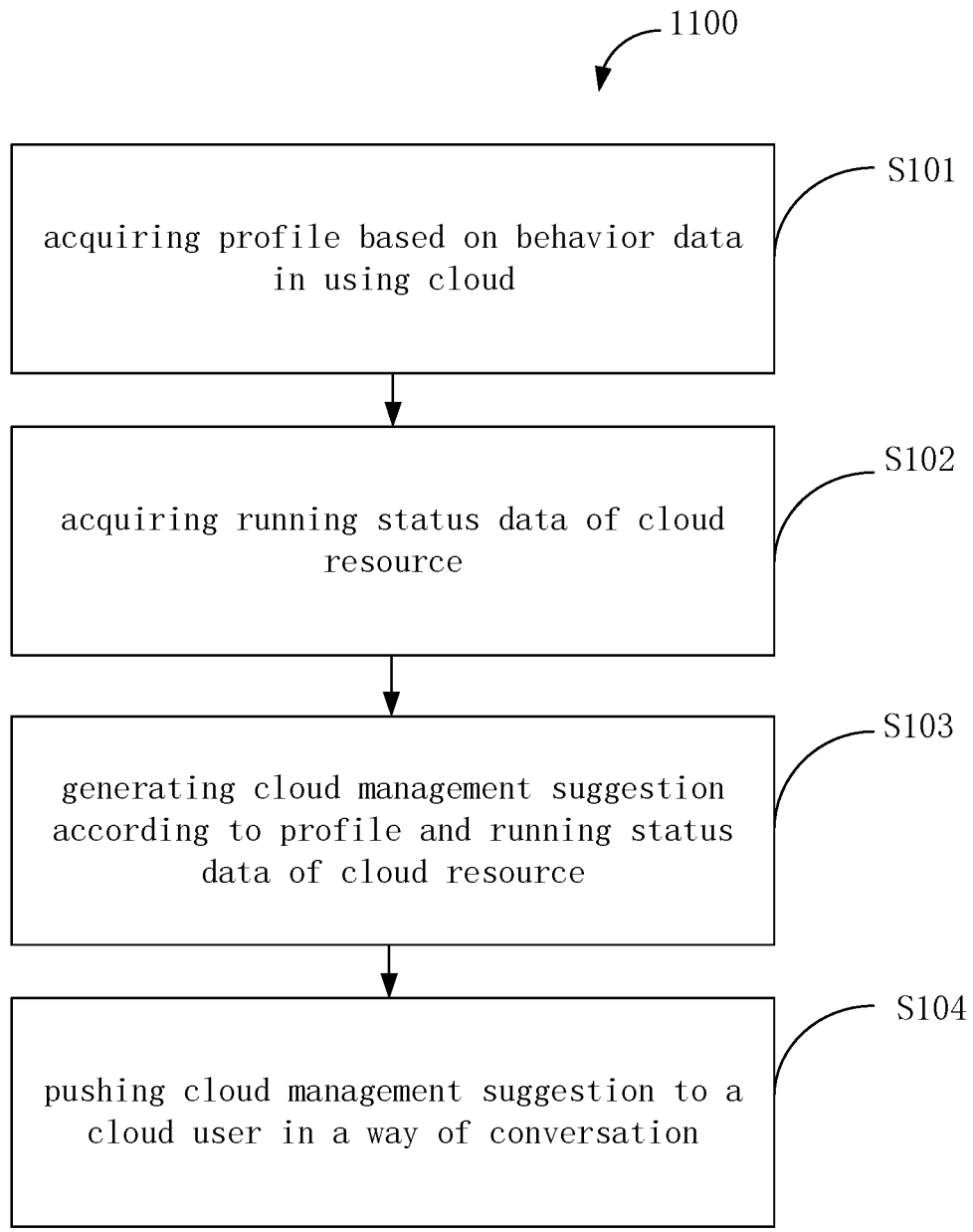
FIG. 11 is a schematic diagram showing processing of intelligent cloud management of an embodiment of the present disclosure.

In the above, detailed description has been made on technical solution of intelligent cloud management with application 1000. In the following further explanation would be made on processing 1100 of intelligent cloud management of embodiments of the present disclosure. As shown in FIG. 11, which is a schematic diagram showing processing 1100 of intelligent cloud management of an embodiment of the present disclosure, the processing 1100 may include:

S101: acquiring profile 107 based on behavior data in using cloud 202. As mentioned above, the profile 107 may be cloud-user profile 201 of cloud tenant, cloud-tenant profile 301, or combination thereof.

In some examples, the cloud-user profile 201 may be generated as follows: acquiring behavior data in using cloud 202 of a cloud user 103, generating the cloud-user profile 201 according to the behavior data in using cloud 202 of the cloud user 103.

In some examples, cloud-tenant profile 301 may be generated as follows: acquiring behavior data in using cloud 202 of a plurality of cloud users 103, generating cloud-tenant profile 301 according to behavior data in using cloud 202 of a plurality of cloud users 103.

In some examples, cloud-tenant profile 301 may be also generated as follows: acquiring cloud-user profile 201 of a plurality of cloud users 103, and generating cloud-tenant profile 301 according to cloud-user profile 201 of a plurality of cloud users 103.

S102: acquiring running status data of cloud resource 108. More particularly, cloud resource running status may be monitored so that running status data of cloud resource 108 may be obtained.

It should be noted that flow chart is shown in drawings for illustration, but there is no limit on sequence of the above S101 and S102, and these two steps may be performed in parallel or sequentially.

S103: generating cloud management suggestion 109 according to profile 107 and running status data of cloud resource 108. In some examples, cloud management suggestion 109 may include one or more of alert cloud management suggestion, optimizing cloud management suggestion, prediction cloud management suggestion.

In some examples, this step may be performed by a third-party Bot module 702. More particularly, such step may include: sending profile 107 and running status data of cloud resource 108 to the third-party Bot module 702 and obtaining cloud management suggestion 109 returned by the third-party Bot module 702.

Furthermore, in some examples, during generating cloud management suggestion 109 by a third-party Bot module 702, the following steps may be further included: selecting a matched third-party Bot module 702 according to profile 107 and running status data of cloud resource 108 and sending the profile 107 and running status data of cloud resource 108 to that third-party Bot module 702.

Furthermore, the processing 1100 may further include: receiving feedback information of a cloud user 103, and performing ranking on the plurality of third-party Bot modules 702 according to the feedback information.

In some examples, the above processing 1100 may further include: acquiring preset cloud management template 801, which may be preset by a cloud user 103. Accordingly, the above step S103 may further include: generating cloud management information 109 according to the profile 107, running status data of cloud resource 108 and the preset cloud management suggestion 109.

More particularly, in some examples, preset management matters and/or related parameters of management matters may be recorded in the preset cloud management template 801.

S104: pushing cloud management suggestion to a cloud user 103 in a way of conversation.

In some examples, during conversation, input information of the cloud user 103 may be obtained, and new cloud management suggestion 109 may be obtained according to profile 107, running status data of cloud resource 108 and input information of cloud user 103, and then the new cloud management suggestion 109 may be pushed to the cloud user 103.

More particularly, the input information of cloud user 103 may include one or more of character information input by a cloud user 103, voice information input by a cloud user 103, and emotion information of cloud user 103, environment information where a cloud user 103 is located, time information for responding conversation by a cloud user 103.

Implementation of each processing operation in the above steps has been detailed described in the above and may be similarly applied to the above steps.

Examples of Implementation

Figure 12:
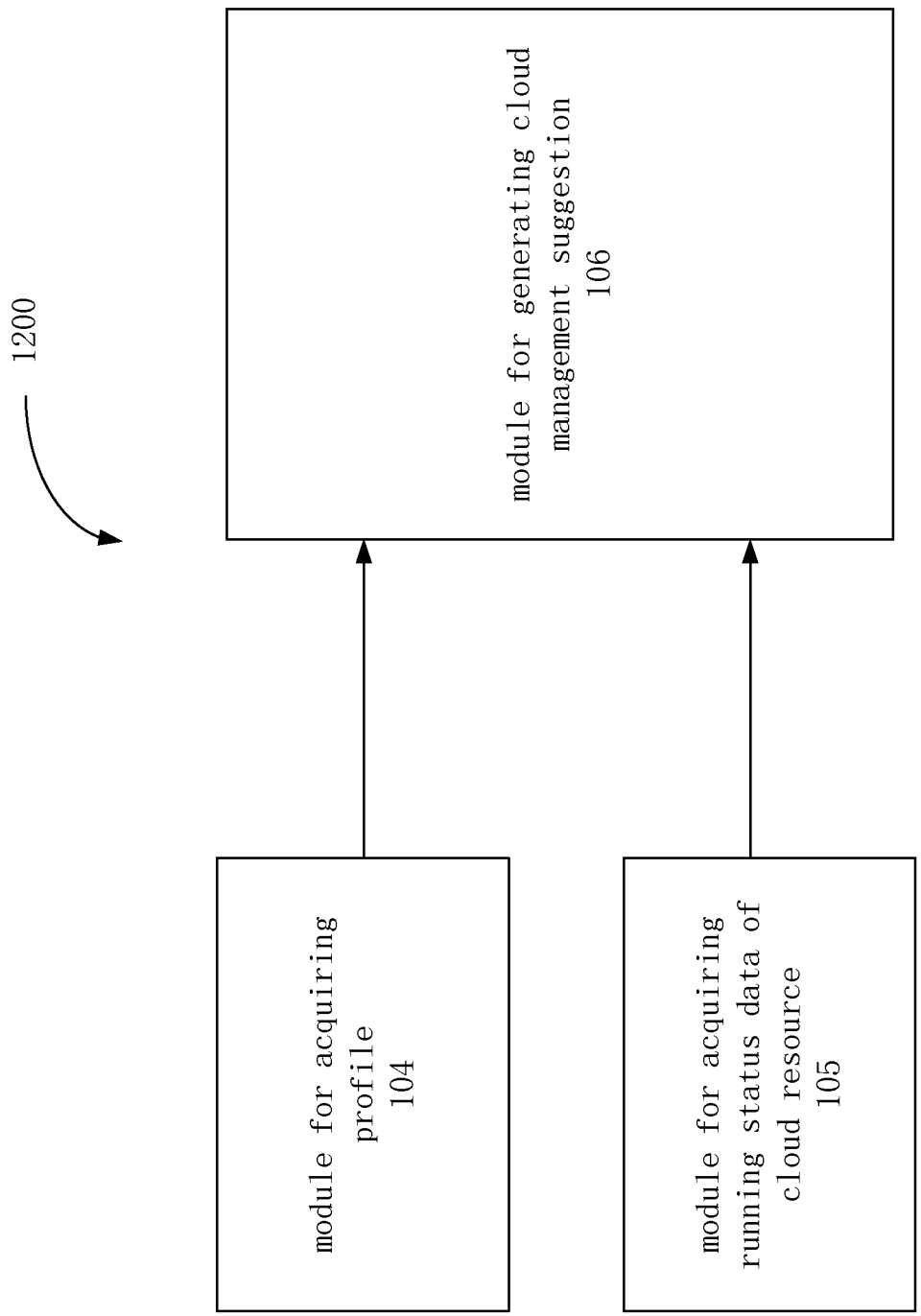
FIG. 12 is a block diagram of an intelligent cloud management device of an embodiment of the present disclosure.

As shown in FIG. 12, which is a block diagram 1200 of an intelligent cloud management device of an embodiment of the present disclosure, the intelligent cloud management device may include: module 104 for acquiring profile, module 105 for acquiring running status data of cloud resource, and module 106 for generating cloud management suggestion.

More particularly, the module 104 for acquiring profile may be configured to acquire profile based on behavior data in using cloud; the module 105 for acquiring running status data of cloud resource may be configured to acquire running status data of cloud resource 108; the module 106 for generating cloud management suggestion may be configured to generate cloud management suggestion 109 at least according to profile 107 and running status data of cloud resource 108.

The above intelligent cloud management device may be provided in a server of cloud supplier 101, or in a server of cloud tenant or in a computer of a cloud user 103.

Furthermore, in some examples, each component or module related in the above FIG. 1 to FIG. 10 and FIG. 12, such as module 104 for acquiring profile, module 105 for acquiring running status data of cloud resource, module 106 for generating cloud management suggestion, Bot module 601, primary Bot module 701, third-party Bot module 702, and the like, and one or more steps in the flow chart shown in FIG. 11 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 13:
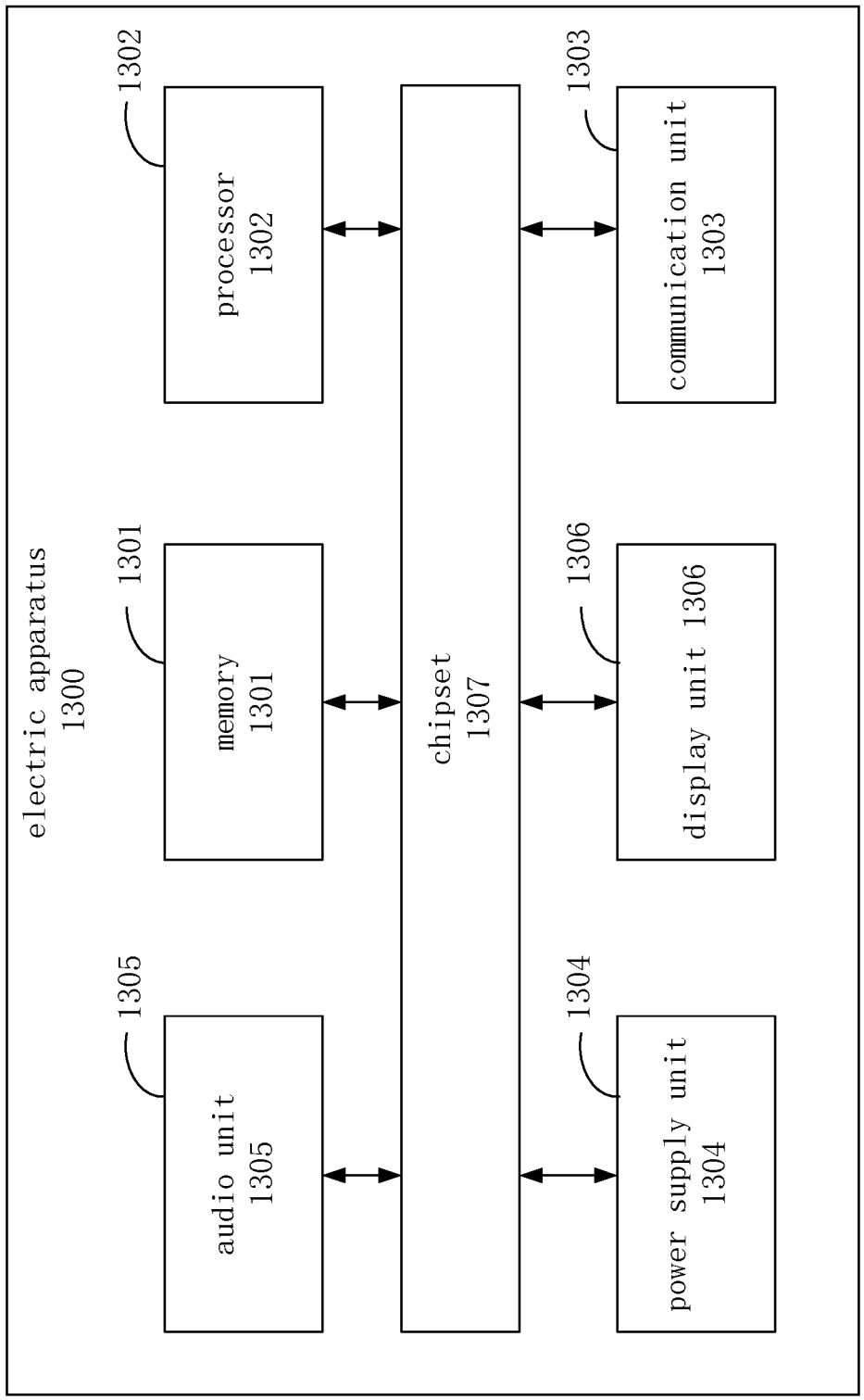
FIG. 13 is a block diagram of an electric apparatus of an embodiment of the present disclosure.

As shown in FIG. 13, which is a block diagram of an electric apparatus 1300 of an embodiment of the present disclosure, the electric apparatus 1300 may include: a memory 1301 and a processor 1302.

The memory 1301 may be configured to store programs. In addition to the above programs, the memory 1301 may be configured to store other data to support operations on the electric apparatus 1300. The examples of these data may include instructions of any applications or methods operated on the electric apparatus 1300, contact data, phone book data, messages, pictures, videos, and the like.

The memory 1301 may be implemented by any kind of volatile or nonvolatile storage device or their combinations, such as static random access memory (SRAM), electronically erasable programmable read-only memory (EEPROM), erasable programmable read-only memory (EPROM), programmable read-only memory (PROM), read-only memory (ROM), magnetic memory, flash memory, disk memory, or optical disk.

The memory 1301 may be coupled to the processor 1302 and contain instructions stored thereon. The instructions may cause the electric apparatus to perform operations upon being executed, the operations may include: acquiring profile 107 based on behavior data in using cloud 202; acquiring running status data of cloud resource 108; generating cloud management suggestion 109 at least according to profile 107 and running status data of cloud resource 108. Furthermore, the above operations may include pushing cloud management suggestion 109 to a cloud user 103 in a way of conversation. Furthermore, during conversation, the following steps may be included: acquiring input information of a cloud user 103; acquiring new cloud management suggestion 109 according to profile 107, running status data of cloud resource 108 and input information of the cloud user 103; and providing the new cloud management suggestion 109 to the cloud user 103.

In some examples, the above profile 107 may include cloud-user profile 201. Then, the acquiring profile based on behavior data in using cloud 202 may include: acquiring behavior data in using cloud 202 of a cloud user 103; generating cloud-user profile 201 according to behavior data in using cloud 202 of the cloud user 103.

In some other examples, the above profile 107 may include cloud-tenant profile 301. Then the acquiring profile 107 based on behavior data in using cloud 202 may include: acquiring cloud-user profile 201 of a plurality of cloud users 103; generating cloud-tenant profile 301 according to cloud-user profile 201 of a plurality of cloud users 103.

Furthermore, in some examples, the generating cloud management suggestion 109 according to profile 107 and running status data of cloud resource 108 may include: sending profile 107 and running status data of cloud resource 108 to a third-party Bot module 702, and acquiring cloud management suggestion 109 returned by the third-party Bot module 702.

The above operations have been detailed described in the above in the embodiments of the above methods and apparatus, and may be similarly applied to electric apparatus 1300. That is, the operations mentioned in the above embodiments may be recorded in memory 1301 in program and be performed by processor 1302.

Furthermore, as shown in FIG. 13, the electric apparatus 1300 may further include: a communication unit 1303, a power supply unit 1304, an audio unit 1305, a display unit 1306, chipset 1307, and other units. Only part units are exemplarily shown in FIG. 13 and it is obvious to one skilled in the art that the electric apparatus 1300 only includes the units shown in FIG. 13.

The communication unit 1303 may be configured to facilitate wireless or wired communication between the electric apparatus 1300 and other apparatuses. The electric apparatus may be connected to wireless network based on communication standard, such as WiFi, 2G, 3G, or their combination. In an exemplary example, the communication unit 1303 may receive radio signal or radio related information from external radio management system via radio channel. In an exemplary example, the communication unit 1303 may further include near field communication (NFC)

module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 1304 may be configured to supply power to various units of the electric apparatus. The power supply unit 1304 may include a power supply management system, one or more power supplies, and other units related to power generation, management, and allocation.

The audio unit 1305 may be configured to output and/or input audio signals. For example, the audio unit 1305 may include a microphone (MIC). When the electric apparatus in an operation mode, such as calling mode, recording mode, and voice recognition mode, the MIC may be configured to receive external audio signals. The received audio signals may be further stored in the memory 1301 or sent via the communication unit 1303. In some examples, the audio unit 1305 may further include a speaker configured to output audio signals.

The display unit 1306 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 1301, processor 1302, communication unit 1303, power supply unit 1304, audio unit 1305 and display unit 1306 may be connected with the chip set 1307. The chip set 1307 may provide interface between the processor 1302 and other units of the electric apparatus 1300. Furthermore, the chip set 1307 may provide interface for each unit of the electric apparatus 1300 to access the memory 1301 and communication interface for accessing among units.

Example Clauses

A. A method, including: acquiring profile based on behavior data in using cloud; acquiring running status data of cloud resource; and generating cloud management suggestion at least according to the profile and the running status data of cloud resource.

B. The method according to paragraph A, wherein the profile may include cloud-tenant profile, and the acquiring profile based on behavior data in using cloud may include: acquiring behavior data in using cloud of a plurality of cloud users; and generating the cloud-tenant profile according to the behavior data in using cloud of the plurality of cloud users.

C. The method according to paragraph A, wherein the profile may include cloud-user profile, and the acquiring profile based on the behavior data in using cloud may include: acquiring behavior data in using cloud of a cloud user; and generating the cloud-user profile according to the behavior data in using cloud of the cloud user.

D. The method according to paragraph A, wherein the profile may include cloud-tenant profile, and the acquiring profile based on the behavior data in using cloud may include: acquiring cloud-user profile of a plurality of cloud users; and generating the cloud-tenant profile according to the cloud-user profile of the plurality of cloud users.

E. The method according to paragraph A, wherein the generating cloud management suggestion at least according to the profile and the running status data of cloud resource may include: sending the profile and the running status data of cloud resource to a third-party Bot module, and acquiring the cloud management suggestion returned by the third-party Bot module.

F. The method according to paragraph E, wherein the sending the profile and the running status data of cloud resource to a third-party Bot module may include: selecting a third-party Bot module from a plurality of third-party Bot modules according to the profile and the running status data of cloud resource, and sending the profile and the running status data of cloud resource to the selected third-party Bot module.

G. The method according to paragraph F, further including: receiving feedback information from a cloud user, and performing ranking on the plurality of third-party Bot modules according to the feedback information.

H. The method according to paragraph A, further including: pushing the cloud management suggestion to a cloud user in conversation.

I. The method according to paragraph H, further including: acquiring input information of the cloud user during conversation; acquiring another cloud management suggestion according to the profile, the running status data of cloud resource, and the input information of the cloud user; and
pushing the another cloud management suggestion to the cloud user.

J. The method according to paragraph I, wherein the input information of the cloud user may include one or more of: word information input by the cloud user, voice information input by the cloud user, emotion information of the cloud user, environment information of environment where the cloud user is in, time information on period for the cloud user to response to the conversation.

K. The method according to paragraph A, further including: acquiring a preset cloud management template; the generating cloud management suggestion at least according to the profile and the running status data of cloud resource may include: generating cloud management suggestion according to the profile, the running status data of cloud resource and the preset cloud management template.

L. The method according to paragraph K, wherein preset management matters and/or related parameters of management matters are recorded in the preset cloud management template.

M. The method according to paragraph A, wherein the cloud management suggestion may include: one or more of alert cloud management suggestion, optimizing cloud management suggestion, and prediction cloud management suggestion.

N. An electric apparatus, including: a processing unit; and a memory, coupled to the processing unit and containing instructions stored thereon, the instructions cause the electric apparatus to perform operations upon being executed by the processing unit, the operations may include: acquiring profile based on behavior data in using cloud; acquiring running status data of cloud resource; and generating cloud management suggestion at least according to the profile and the running status data of cloud resource.

O. The electric apparatus according to paragraph N, wherein the profile may include a cloud-user profile, and the acquiring profile based on behavior data in using cloud may include: acquiring behavior data in using cloud of a cloud user; and generating the cloud-user profile according to the behavior data in using cloud of the cloud user.

P. The electric apparatus according to paragraph N, wherein the profile may include cloud-tenant profile, and the acquiring profile based on the behavior data in using cloud may include: acquiring cloud-user profile of a plurality of cloud users; and generating the cloud-tenant profile according to the cloud-user profile of the plurality of cloud users.

Q. The electric apparatus according to paragraph N, wherein the generating cloud management suggestion at least according to the profile and the running status data of cloud resource may include: sending the profile and the running status data of cloud resource to a third-party Bot module, and acquiring the cloud management suggestion returned by the third-party Bot module.

R. The electric apparatus according to paragraph N, wherein the operations further include: pushing the cloud management suggestion to a cloud user in conversation.

S. The electric apparatus according to paragraph R, wherein the operations further include: acquiring input information of the cloud user during conversation; acquiring another cloud management suggestion according to the profile, the running status data of cloud resource, and the input information of the cloud user; and providing the another cloud management suggestion to the cloud user.

T. A device, including: a module for acquiring profile configured to acquire profile based on behavior data in using cloud; a module for acquiring running status data of cloud resource configured to acquire running status data of cloud resource; and a module for generating cloud management suggestion configured to generate cloud management suggestion at least according to the profile and the running status data of cloud resource.

It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:

1. A method, comprising:
accessing behavior data of at least one user in using a cloud operating system;
using the behavior data, generating a profile identifying cloud using characteristics of the at least one user or cloud tenant associated with the at least one user;
acquiring running status data of a cloud resource;
transmitting the profile and the running status data of the cloud resource to a Bot module, and
in response to the transmitting, acquiring, from the Bot module, a cloud management suggestion to adjust one or more cloud resources based on a predicted future state that is predicted based on at least the profile and the running status data of the cloud resource.

2. The method of claim 1, wherein the Bot module is an artificial intelligence (AI) module built on an AI data platform within a module for generating cloud management suggestions.

3. The method of claim 1, wherein the Bot module is a third-party Bot module running on a third-party AI data platform.

4. The method of claim 1, wherein the accessing the behavior data comprises accessing a log file of the cloud operating system.

5. The method of claim 1, wherein the accessing the behavior data comprises accessing the behavior data from a monitoring module.

6. The method of claim 1, wherein the profile comprises a user profile, and generating the profile comprises:
accessing the behavior data of a user of the at least one user in using one or more cloud resources; and
generating the user profile according to the behavior data of the user in using the one or more cloud resources.

7. The method of claim 1, wherein the profile comprises a cloud-tenant profile, and generating the profile comprises:
accessing at least one user profile of a plurality of users of a tenant; and
generating the cloud tenant profile according to the at least one user profile of the plurality of users.

8. The method of claim 1, wherein the transmitting comprises:
selecting the Bot module from a plurality of Bot modules according to the profile and the running status data of the cloud resource, and
sending the profile and the running status data of the cloud resource to the selected Bot module.

9. The method of claim 8, further comprising:
receiving feedback from a user, and
performing ranking on the plurality of Bot modules according to the feedback.

10. An apparatus, comprising:
a processing unit; and
a memory, coupled to the processing unit and containing instructions stored thereon, the instructions causing the apparatus to perform operations upon being executed by the processing unit, the operations comprising:
accessing behavior data of at least one user in using a cloud operating system;
using the behavior data, generating a profile identifying cloud using characteristics of the at least one user or cloud tenant associated with the at least one user;
acquiring running status data of a cloud resource;
transmitting the profile and the running status data of the cloud resource to a Bot module, and
in response to the transmitting, acquiring, from the Bot module, a cloud management suggestion to adjust one or more cloud resources based on a predicted future state that is predicted based on at least the profile and the running status data of the cloud resource.

11. The apparatus of claim 10, wherein the Bot module is an artificial intelligence (AI) module built on an AI data platform within a module for generating cloud management suggestions.

12. The apparatus of claim 10, wherein the Bot module is a third-party Bot module running on a third-party AI data platform.

13. The apparatus of claim 10, wherein the accessing the behavior data comprises accessing a log file of the cloud operating system.

14. The apparatus of claim 10, wherein the accessing the behavior data comprises accessing the behavior data from a monitoring module.

15. The apparatus according to claim 10, wherein the predicted future state is based on a predicted problem determined based on the running status data of the cloud resource.

16. The apparatus according to claim 10, wherein the Bot module uses the profile and a data analysis on a virtual machine loading capacity in order to determine the predicted future state.

17. A non-transitory storage medium storing a set of instructions that, when executed by one or more hardware processors, causes the one or more hardware processors to perform operations comprising:
- accessing behavior data of at least one user in using a cloud operating system;
- using the behavior data, generating a profile identifying cloud using characteristics of the at least one user or cloud tenant associated with the at least one user;
- acquiring running status data of a cloud resource;
- transmitting the profile and the running status data of the cloud resource to a Bot module, and
- in response to the transmitting, acquiring, from the Bot module, a cloud management suggestion to adjust one or more cloud resources based on a predicted future state that is predicted based on at least the profile and the running status data of the cloud resource.

18. The non-transitory storage medium of claim 17, wherein the Bot module is an artificial intelligence (AI) module built on an AI data platform within a module for generating cloud management suggestions.

19. The non-transitory storage medium of claim 17, wherein the accessing the behavior data comprises accessing the behavior data from a monitoring module.

20. The non-transitory storage medium of claim 17, wherein the Bot module uses the profile and a data analysis on a virtual machine loading capacity in order to determine the predicted future state.

* * * * *